(12) United States Patent
Ashida et al.

(10) Patent No.: US 12,532,668 B2
(45) Date of Patent: Jan. 20, 2026

(54) MAGNETIC ELEMENT AND MAGNETIC MEMORY ARRAY

(71) Applicant: TDK CORPORATION, Tokyo (JP)

(72) Inventors: Takuya Ashida, Tokyo (JP); Tatsuo Shibata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 547 days.

(21) Appl. No.: 17/623,540

(22) PCT Filed: Jul. 3, 2020

(86) PCT No.: PCT/JP2020/026264
§ 371 (c)(1),
(2) Date: Dec. 28, 2021

(87) PCT Pub. No.: WO2021/006219
PCT Pub. Date: Jan. 14, 2021

(65) Prior Publication Data
US 2022/0359817 A1 Nov. 10, 2022

(30) Foreign Application Priority Data
Jul. 5, 2019 (JP) .................. 2019-126005

(51) Int. Cl.
*H10N 52/80* (2023.01)
*H10B 61/00* (2023.01)
*H10N 52/00* (2023.01)

(52) U.S. Cl.
CPC ............. *H10N 52/80* (2023.02); *H10B 61/00* (2023.02); *H10N 52/00* (2023.02)

(58) Field of Classification Search
CPC ........ H10N 52/80; H10N 52/00; H10N 50/85; H10N 50/10; H10B 61/00; H10B 61/22; H10D 48/40
See application file for complete search history.

(56) References Cited

U.S. PATENT DOCUMENTS

2011/0199818 A1 8/2011 Fukami et al.
2018/0123021 A1* 5/2018 Sasaki .................... H10N 50/85
(Continued)

FOREIGN PATENT DOCUMENTS

| CN | 111279489 A | 6/2020 |
| JP | 5397384 B2 | 1/2014 |
| JP | 6275806 B1 | 2/2018 |

OTHER PUBLICATIONS

Sep. 24, 2020 Search Report issued in the International Patent Application No. PCT/JP2020/026264.

*Primary Examiner* — Latanya N Crawford Eason
(74) *Attorney, Agent, or Firm* — Oliff PLC

(57) ABSTRACT

A magnetic element according to an embodiment includes a wiring layer extending in a first direction and including a ferromagnetic material and a nonmagnetic layer laminated on the wiring layer in a second direction. The wiring layer includes a side surface inclined with respect to the second direction in a cross section orthogonal to the first direction. The side surface has one or more bending points at which an inclination angle with respect to the second direction becomes discontinuous. An inclination angle of a first inclined surface far from the nonmagnetic layer is smaller than an inclination angle of a second inclined surface close to the nonmagnetic layer in a state in which a first bending point at a position farthest from the nonmagnetic layer among the bending points is interposed between the inclination angles.

20 Claims, 14 Drawing Sheets

(56) References Cited

U.S. PATENT DOCUMENTS

| | | |
|---|---|---|
| 2018/0159024 A1 | 6/2018 | Buyandalai et al. |
| 2020/0273511 A1* | 8/2020 | Ashida .................. H10N 50/10 |
| 2020/0350490 A1* | 11/2020 | Shiokawa .............. H10N 52/80 |
| 2021/0013398 A1 | 1/2021 | Shiokawa |

* cited by examiner

MAGNETIC ELEMENT AND MAGNETIC MEMORY ARRAY

TECHNICAL FIELD

The present invention relates to a magnetic element and a magnetic memory array (magnetic recording array). The present application claims priority on Japanese Patent Application No. 2019-126005 filed on Jul. 5, 2019, the content of which is incorporated herein by reference.

BACKGROUND ART

Next-generation non-volatile memories for replacing flash memories and the like whose miniaturization is limited are receiving attention. For example, a magnetoresistive random access memory (MRAM), a resistive random access memory (ReRAM), a phase change random access memory (PCRAM), and the like are known as the next-generation non-volatile memories.

An MRAM uses a change in a resistance value caused by a change in a direction of magnetization for a data recording process. Each of magnetoresistance change elements constituting the MRAM is responsible for the data recording process. For example, in Patent Document 1, a magnetoresistance change element (a magnetic domain wall movement element) capable of recording multi-valued data by moving a magnetic domain wall within a magnetic recording layer is disclosed.

Also, for example, in Patent Document 2, a magnetoresistance change element (an SOT element) for performing a data rewriting process (reversal of magnetization) using a spin-orbit torque is disclosed. In Patent Document 2, technology for preventing an increase in power consumption of the SOT element by inclining a side surface of a laminate SBI laminated on a metal-containing layer 21 is disclosed.

PRIOR ART DOCUMENTS

Patent Document

Patent Document 1: Japanese Patent No. 5397384
Patent Document 2: Japanese Patent No. 6275806

DISCLOSURE OF INVENTION

Problems to be Solved by the Invention

A magnetic domain wall movement element records data at a position of a magnetic domain wall in a multi-value or analog mode. In order to record data in the multi-value or analog mode, it is preferable that the magnetic domain wall move slowly. This is because, when the magnetic domain wall is sensitive to an external force, the data will change significantly even if a small amount of external force is applied. When a resistance-area product (RA) of the magnetic domain wall movement element is increased, a moving speed of the magnetic domain wall becomes slow. The resistance-area product (RA) of the magnetic domain wall movement element is implemented, for example, by increasing a thickness of the nonmagnetic layer.

On the other hand, when the side surface of the laminate is inclined according to milling or the like as in Patent Document 2 if the thickness of the nonmagnetic layer is thick, a shadow portion of the nonmagnetic layer increases and a width of a hem portion thereof increases. When the width of the hem portion of the laminate increases, a cross-sectional area of the wiring layer to which the magnetic domain wall moves becomes large. The magnetic domain wall moves due to the reversal of magnetization and a minimum current density required for reversal of magnetization is referred to as a critical electric current density. When the cross-sectional area of the wiring layer to which the magnetic domain wall moves increases, an amount of electric current required to secure the criticality increases, an operating current of the magnetic domain wall movement element increases; and as a result, the power consumption increases.

Also, the above problem is not limited to the magnetic domain wall movement element. For example, in the SOT element described in Patent Document 2, a hem of the conductive layer, which is a shadow of the nonmagnetic layer during milling or the like, also becomes wide. When the cross-sectional area of the conductive layer is large, the electric current density of the conductive layer when the same electric current is applied becomes small; and as a result, the operating current of the SOT element becomes large.

The present invention has been made in view of the above-described problems and the present invention provides a magnetic element and a magnetic recording array capable of reducing an operating current.

Solutions for Solving the Problems (1) According to a first aspect, there is provided a magnetic element including: a wiring layer extending in a first direction and including a ferromagnetic material; and a nonmagnetic layer laminated on the wiring layer in a second direction, wherein the wiring layer includes a side surface inclined with respect to the second direction in a cross section orthogonal to the first direction, wherein the side surface has one or more bending points at which an inclination angle with respect to the second direction becomes discontinuous, and wherein an inclination angle of a first inclined surface far from the nonmagnetic layer is smaller than an inclination angle of a second inclined surface close to the nonmagnetic layer in a state in which a first bending point at a position farthest from the nonmagnetic layer among the bending points is interposed between the inclination angles.

(2) In the magnetic element according to the above-described aspect, the wiring layer may include a first ferromagnetic layer, a magnetic recording layer, and a nonmagnetic underlayer in order from a position closest to the nonmagnetic layer.

(3) In the magnetic element according to the above-described aspect, the wiring layer may include a first ferromagnetic layer and a conductive layer in order from a position closest to the nonmagnetic layer.

(4) In the magnetic element according to the above-described aspect, the first bending point may be located on a side surface of the first ferromagnetic layer.

(5) In the magnetic element according to the above-described aspect, the first bending point may be located on a side surface of the magnetic recording layer.

(6) In the magnetic element according to the above-described aspect, the first bending point may be located on a side surface of the underlayer.

(7) In the magnetic element according to the above-described aspect, the first bending point may be located on a side surface of the conductive layer.

(8) In the magnetic element according to the above-described aspect, the first bending point may be located at a boundary between the first ferromagnetic layer and the magnetic recording layer.

(9) In the magnetic element according to the above-described aspect, the first bending point may be located at a boundary between the magnetic recording layer and the underlayer.

(10) In the magnetic element according to the above-described aspect, the first bending point may be located at a boundary between the first ferromagnetic layer and the conductive layer.

(11) In the magnetic element according to the above-described aspect, a distance between an end portion of the nonmagnetic layer and the first bending point may be longer than a distance between an end portion of the wiring layer and the first bending point in the third direction orthogonal to the rust direction and the second direction in the cross section orthogonal to the first direction.

(12) In the magnetic element according to the above-described aspect, a distance between an end portion of the nonmagnetic layer and the first bending point in the second direction may be longer than a distance between an end portion of the wiring layer and the first bending point in the second direction in the cross section orthogonal to the first direction.

(13) In the magnetic element according to the above-described aspect, an inclination angle of the second inclined surface located far from the nonmagnetic layer may be larger than an inclination angle of a third inclined surface located near the nonmagnetic layer in a state in which a second bending point at a position that is second farthest from the nonmagnetic layer next to the first bending point among the bending points is interposed between the inclination angles.

(14) In the magnetic element according to the above-described aspect, a distance between the first bending point and the second bending point may be longer than a distance between the end portion of the wiring layer and the first bending point in the third direction orthogonal to the first direction and the second direction in the cross section orthogonal to the first direction.

(15) In the magnetic element according to the above-described aspect, a distance between the first bending point and the second bending point in the second direction may be longer than a distance between an end portion of the wiring layer and the first bending point in the second direction in the cross section orthogonal to the first direction.

(16) In the magnetic element according to the above-described aspect, the first bending point may extend in the first direction.

(17) In the magnetic element according to the above-described aspect, a resistance-area product (RA) of the nonmagnetic layer may be $1 \times 10^4$ $\Omega\mu m^2$ or more.

(18) The magnetic element according to the above-described aspect may further include an insulating layer on a surface of the wiring layer opposite to the nonmagnetic layer.

(19) The magnetic element according to the above-described aspect may further include a second ferromagnetic layer on the nonmagnetic layer opposite to the wiring layer.

(20) According to a second aspect, there is provided a magnetic recording array having a plurality of the magnetic elements according to the above-described aspect.

Effects of Invention

According to the above-described aspects, a magnetic element and a magnetic recording array can reduce an operating current.

EMBODIMENTS FOR CARRYING OUT THE INVENTION

Figure 1:
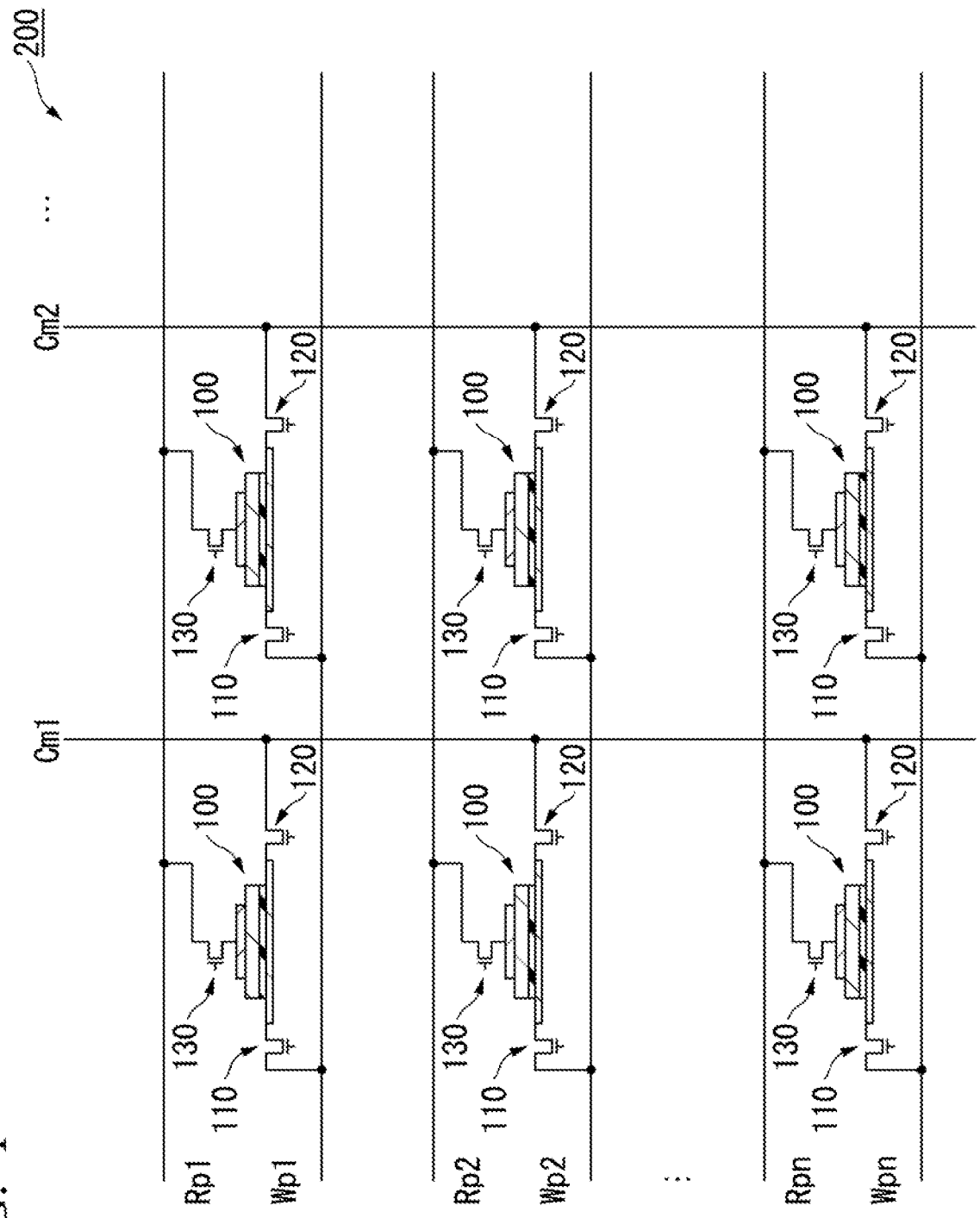
FIG. 1 is a configuration diagram of a magnetic recording array according to a first embodiment.

Hereinafter, the present embodiment will be described in detail with reference to the drawings as appropriate. Enlarged parts with features of the present invention may be shown in the drawings used in the following description for convenience so that the features of the present invention are easily understood. Dimension ratios and the like of each component may be different from actual data. Materials, dimensions, and the like exemplified in the following description are examples, the present invention is not limited thereto, and modifications can be appropriately made within the range in which the effects of the present invention are exhibited.

First, directions are defined. A +x direction, a −x direction, a +y direction, and a −y direction are directions substantially parallel to one surface of a substrate Sub (see FIG. 2) to be described below. The +x direction is a direction in which a wiring layer 10 to be described below extends and is a direction from a first conductive layer 40 to be described below to a second conductive layer 50. The −x direction is a direction opposite to the +x direction. When the +x direction and the −x direction are not distinguished, they are simply referred to as an "x direction." The x direction is an example of a first direction. The +y direction is one direction orthogonal to the x direction. The −y direction is opposite to the +y direction. When the +y direction and the −y direction are not distinguished, they are simply referred to as a "y direction." The y direction is an example of a third direction. A +z direction is a direction from the substrate Sub to be described below toward a magnetic domain wall movement element 100. A −z direction is opposite to the +z direction. When the +z direction and the −z direction are not distinguished, they are simply referred to as a "z direction." The z direction is an example of a second direction. Also, in the present specification, "extending in the x direction" means that, for example, a dimension in the x direction is larger than the smallest dimension among dimensions in the x direction, the y direction, and the z direction. The same is also true for a case of extending in other directions.

First Embodiment

FIG. 1 is a configuration diagram of a magnetic recording array according to the first embodiment. A magnetic recording array 200 includes a plurality of magnetic domain wall movement elements 100, a plurality of first wirings Wp1 to Wpn, a plurality of second wirings Cm1 to Cmn, a plurality of third wirings Rp1 to Rpn, a plurality of first switching elements 110, a plurality of second switching elements 120, and a plurality of third switching elements 130. The magnetic recording array 200 can be used, for example, in a magnetic memory, a multiply-accumulate calculation device, and a neuromorphic device. The magnetic domain wall movement element 100 is an example of a magnetic element.

<First Wiring, Second Wiring, and Third Wiring>

The first wirings Wp1 to Wpn are write wirings. The first wirings Wp1 to Wpn electrically connect a power supply and one or more of the magnetic domain wall movement elements 100. The power supply is connected to one end of the magnetic recording array 200 during use.

The second wirings Cm1 to Cmn are common wirings. The common wirings are wirings that can be used both when data is written and when data is read. The second wirings Cm1 to Cmn electrically connect a reference potential and one or more magnetic domain wall movement elements 1M. The reference potential is, for example, the ground. The second wirings Cm1 to Cmn may be provided in each of the plurality of magnetic domain wall movement elements 100 or may be provided across the plurality of magnetic domain wall movement elements 100.

The third wirings Rp1 to Rpn are read wirings. The third wirings Rp1 to Rpn electrically connect the power supply and one or more magnetic domain wall movement elements 100. The power supply is connected to one end of the magnetic recording array 200 during use.

<First Switching Element, Second Switching Element, and Third Switching Element>

The first switching element 110, the second switching element 120, and the third switching element 130 shown in FIG. 1 are connected to each of the plurality of magnetic domain wall movement elements 100. A device in which a switching element is connected to the magnetic domain wall movement element 100 is referred to as a semiconductor device. The first switching element 110 is connected between each of the magnetic domain wall movement elements 100 and the first wiring Wp1 to Wpn. The second switching element 120 is connected between each of the magnetic domain wall movement elements 100 and the second wiring Cm1 to Cmn. The third switching element 130 is connected between each of the magnetic domain wall movement elements 100 and the third wiring Rp1 to Rpn.

When the first switching element 110 and the second switching element 120 are turned on, a write current flows between the first wiring Wp1 to Wpn and the second wiring Cm1 to Cmn connected to a prescribed magnetic domain wall movement element 100. When the first switching element 110 and the third switching element 130 are turned on, a read current flows between the second wiring Cm1 to Cmn and the third wiring Rp1 to Rpn connected to a prescribed magnetic domain wall movement element 100.

The first switching element 110, the second switching element 120, and the third switching element 130 are elements that control a flow of an electric current. The first switching element 110, the second switching element 120, and the third switching element 130 are, for example, a transistor, an element such as an ovonic threshold switch (OTS) using a phase change of a crystal layer, an element such as a metal-insulator transition (MIT) switch using a change in a band structure, an element such as a Zener diode or an avalanche diode using a breakdown voltage, and an element whose conductivity changes with a change in an atomic position.

Any one of the first switching element 110, the second switching element 120, and the third switching element 130 may be shared by the magnetic domain wall movement elements 100 connected to the same wiring. For example, when the first switching element 110 is shared, one first switching element 110 is provided upstream of the first wirings Wp1 to Wpn. For example, when the second switching element 120 is shared, one second switching element 120 is provided upstream of the second wirings Cm1 to Cmn. For example, when the third switching element 130 is shared, one third switching element 130 is provided upstream of the third wirings Rp1 to Rpn.

Figure 2:
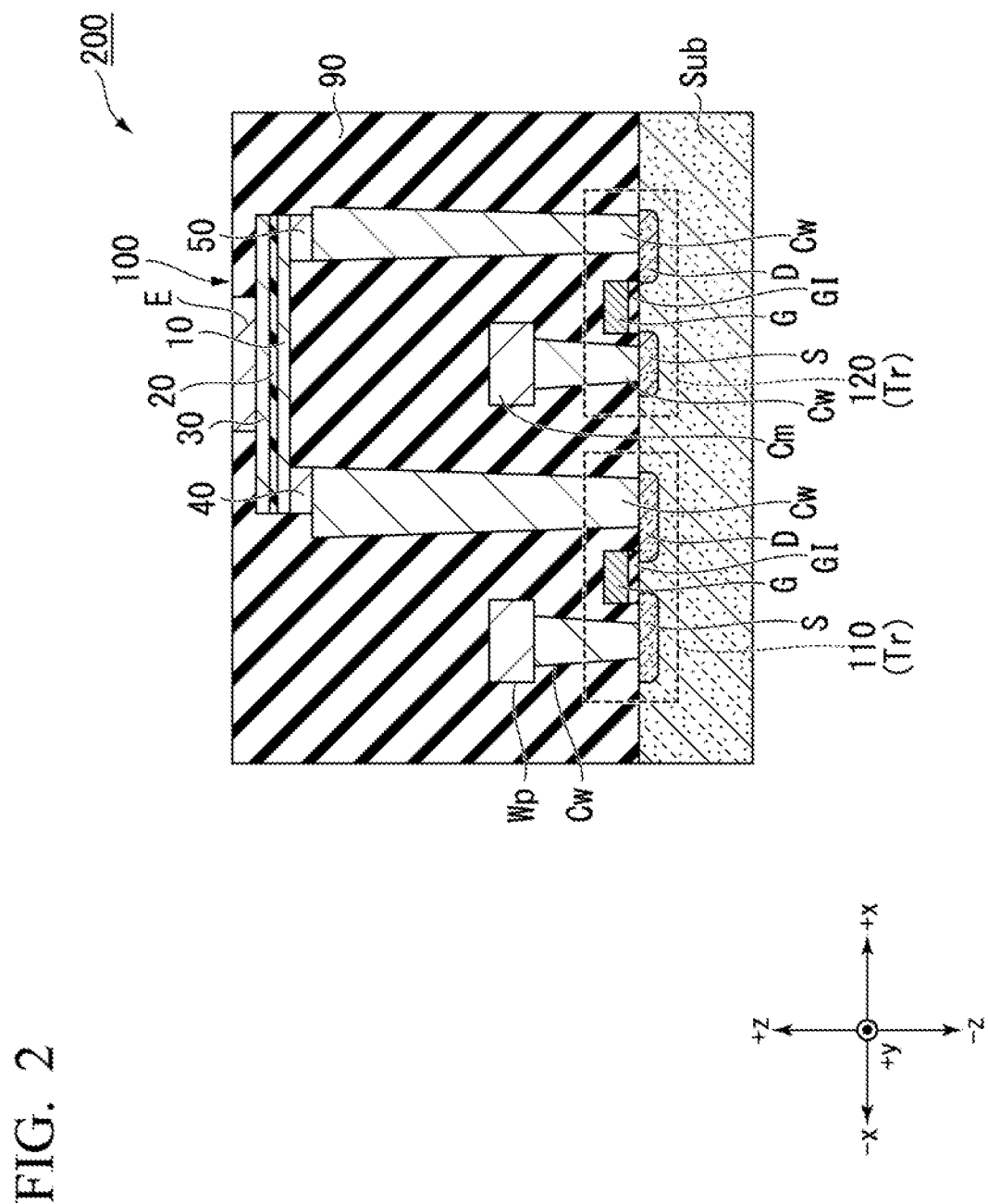
FIG. 2 is a cross-sectional view of characteristic parts of the magnetic recording array according to the first embodiment.

FIG. 2 is a cross-sectional view of characteristic parts of the magnetic recording array 200 according to the first embodiment. FIG. 2 is a cross section of one magnetic domain wall movement element 100 of FIG. 1 cut along an xz plane passing through the center of the width of the wiring layer 10 in the y direction.

The first switching element 110 and the second switching element 120 shown in FIG. 2 are transistors Tr. The transistor Tr includes a gate electrode G, a gate insulating film G1, and a source region S and a drain region D formed on the substrate Sub. The substrate Sub is, for example, a semiconductor substrate. The third switching element 130 is electrically connected to an electrode E and is located, for example, in a paper depth direction (the −y direction).

Each of the transistors Tr and the magnetic domain wall movement element 100 are electrically connected to each other via a connection wiring Cw. The connection wiring Cw contains a material having conductivity. The connection wiring Cw extends, for example, in the z direction. The connection wiring Cw is, for example, a via wiring formed in an opening in an insulating layer 90.

The magnetic domain wall movement element 100 and the transistor Tr are electrically separated by the insulating layer 90 except for the connection wiring Cw. The insulating layer 90 is an insulating layer that insulates between wirings of multilayer wirings or between elements. The insulating layer 90 is, for example, silicon oxide ($SiO_x$), silicon nitride (SiNr), silicon carbide (SiC), chromium nitride, silicon carbonitride (SiCN), silicon oxynitride (SiON), aluminum oxide ($Al_2O_3$), zirconium oxide ($ZrO_x$), or the like. For example, the insulating layer 90 is located on the wiring layer 10 to be described below opposite to the nonmagnetic layer 20.

"Magnetic Domain Wall Movement Element"

Figure 3:
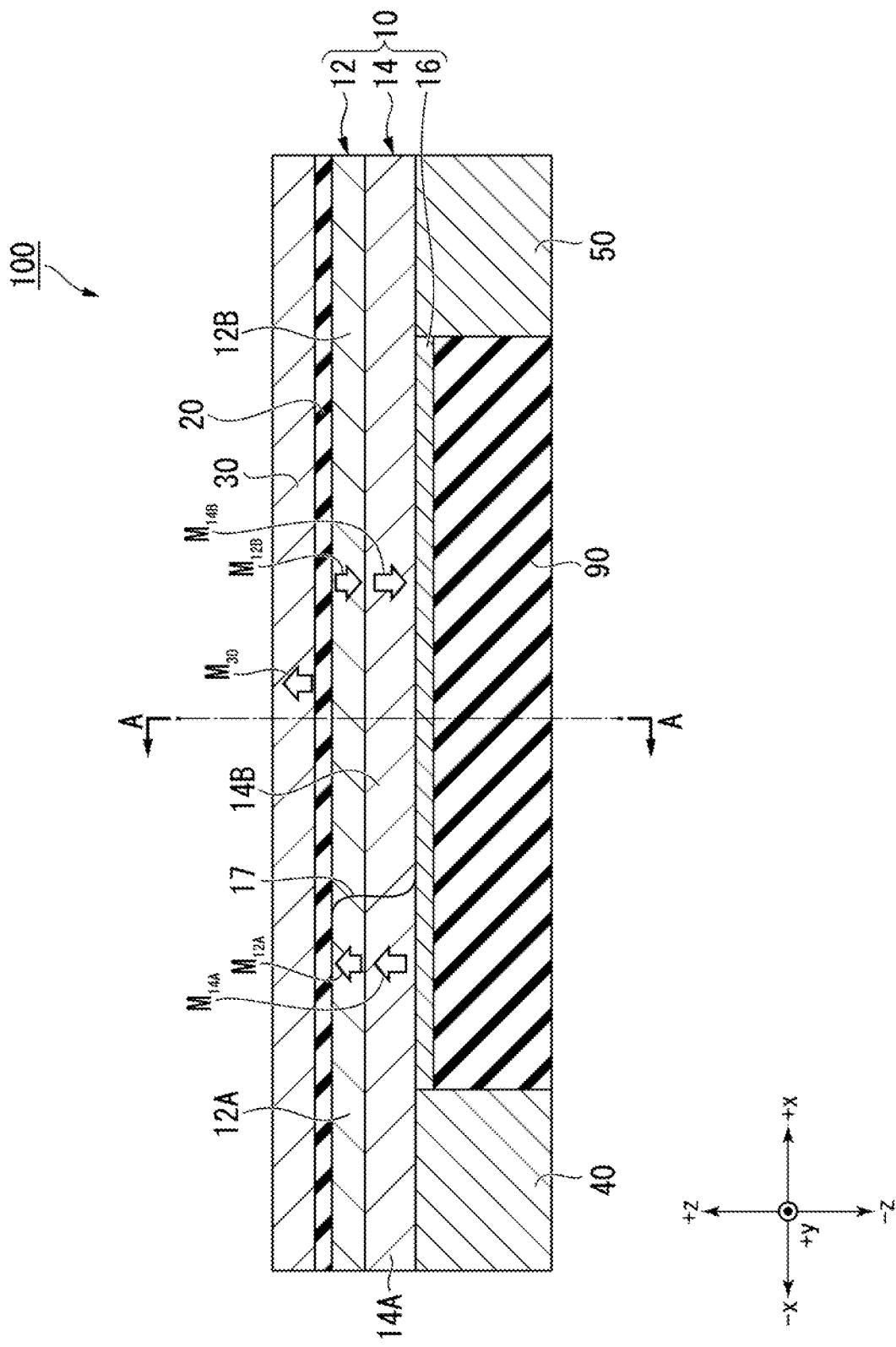
FIG. 3 is a cross-sectional view of a magnetic domain wall movement element according to the first embodiment in an xz plane.

FIG. 3 is a cross-sectional view of the magnetic domain wall movement element 100 cut along the xz plane passing through the center of the wiring layer 10 in the y direction. The magnetic domain wall movement element 100 includes a wiring layer 10, a nonmagnetic layer 20, a second ferromagnetic layer 30, a first conductive layer 40, and a second conductive layer 50.

"Wiring Layer"

The wiring layer 10 is a portion extending in the x direction and includes a portion that can be energized. The wiring layer 10 is, for example, a rectangle having a major axis in the x direction and a minor axis in the y direction in a plan view from the z direction. The wiring layer 10 faces the second ferromagnetic layer 30 in a state in which the nonmagnetic layer 20 is interposed therebetween. The wiring layer 10 is laminated on the insulating layer 90, for example, across the first conductive layer 40 and the second conductive layer 50. An electric current flows along the wiring layer 10 through the insulating layer 90. The wiring layer 10 contains a ferromagnetic material and includes a ferromagnetic layer on the nonmagnetic layer 20 side.

The wiring layer 10 includes, for example, a first ferromagnetic layer 12, a magnetic recording layer 14, and an underlayer 16. The first ferromagnetic layer 12, the magnetic recording layer 14, and the underlayer 16 are located at positions close to the nonmagnetic layer 20 in that order.

The magnetic recording layer 14 is a layer capable of magnetically recording information according to a change in an internal magnetic state. The magnetic recording layer 14 internally includes a first magnetic domain 14A and a second magnetic domain 14B. For example, magnetization $M_{14A}$ of the first magnetic domain 14A and magnetization Mt of the second magnetic domain 14B are oriented in opposite directions. A boundary between the first magnetic domain 14A and the second magnetic domain 14B is a magnetic domain wall 17. The magnetic recording layer 14 can internally include the magnetic domain wall 17. In the magnetic recording layer 14, for example, the magnetization $M_{14A}$ of the first magnetic domain 14A is oriented in the +z direction and the magnetization $M_{14B}$ of the second magnetic domain 14B is oriented in the −z direction.

Although description will be given using an example in which the magnetization is oriented in the z-axis direction hereinafter, the magnetization of the magnetic recording layer 14, the first ferromagnetic layer 12, and the second ferromagnetic layer 30 may be oriented in the x-axis direction or may be oriented in any direction within an xy plane. When the magnetization is oriented in the z direction, the power consumption of the magnetic domain wall movement element 100 and the heat generation during an operation are limited as compared with a case in which the magnetization is oriented within the xy plane. Also, if a pulse current of the same intensity is applied, the movement width of the magnetic domain wall 17 when the magnetization is oriented in the z direction is smaller than that when the magnetization is oriented within the xy plane. On the other hand, a magnetoresistance change width (an MR ratio) of the magnetic domain wall movement element 100 when the magnetization is oriented in any direction within the xy plane is larger than that when the magnetization is oriented in the z direction.

When the magnetic domain wall 17 moves, the ratio between the first magnetic domain 14A and the second magnetic domain 14B changes. The magnetic domain wall 17 is moved by causing the write current to flow in the x direction of the magnetic recording layer 14. For example, when the write current (for example, an electric current pulse) is applied in the +x direction of the magnetic recording layer 14, the magnetic domain wall 17 moves in the −x direction because electrons flow in the −x direction opposite to a direction of the electric current. When the electric current flows from the first magnetic domain 14A to the second magnetic domain 14B, spin-polarized electrons in the second magnetic domain 14B cause the magnetization $M_{14A}$ of the first magnetic domain 14A to be reversed. When the magnetization $M_{14A}$ of the first magnetic domain 14A is reversed, the magnetic domain wall 17 moves in the −x direction.

The magnetic recording layer 14 consists of a magnetic material. The magnetic recording layer 14 preferably includes at least one element selected from the group consisting of Co. Ni, Pt, Pd, Gd. Tb, Mn, Ge, and Ga. Examples of materials used for the magnetic recording layer 14 include a laminated film of Co and Ni, a laminated film of Co and Pt, a laminated film of Co and Pd, a MnGa-based material, a GdCo-based material, a TbCo-based material, and the like. Because ferrimagnetic materials such as the MnGa-based material, the GdCo-based material, and the TbCo-based material have small saturation magnetization, the threshold current required to move the magnetic domain wall 17 is small. Also, the laminated film of Co and Ni, the laminated film of Co and Pt, and the laminated film of Co and Pd have a large coercive force and the moving speed of the magnetic domain wall 17 becomes slow therewith.

The first ferromagnetic layer 12 is located between the magnetic recording layer 14 and the nonmagnetic layer 20. The first ferromagnetic layer 12 is magnetically coupled to the magnetic recording layer 14. The first ferromagnetic layer 12 is magnetically coupled to the magnetic recording layer 14, so that a magnetic state of the magnetic recording layer 14 is reflected therein. When the first ferromagnetic layer 12 and the magnetic recording layer 14 are ferromagnetically coupled, the magnetic state of the first ferromagnetic layer 12 becomes the same as the magnetic state of the magnetic recording layer 14. When the first ferromagnetic layer 12 and the magnetic recording layer 14 are antiferromagnetically coupled, the magnetic state of the first ferromagnetic layer 12 is opposite to the magnetic state of the magnetic recording layer 14.

The first ferromagnetic layer 12 faces the second ferromagnetic layer 30 and causes a change in magnetoresistance. A resistance value of the magnetic domain wall movement element 100 is changed by a relative angle difference between the magnetization of the second ferromagnetic layer 30 and the magnetization of the first ferromagnetic layer 12. The first ferromagnetic layer 12 reflects the magnetic state of the magnetic recording layer 14 and is divided into a first magnetic domain 12A and a second magnetic domain 12B. Magnetization $M_{12A}$ of the first magnetic domain 12A is, for example, in the same direction as (parallel to) magnetization Mio of the second ferromagnetic layer 30, and magnetization $M_{12B}$ of the second magnetic domain 12B is, for example, in the direction opposite (anti-parallel) to the magnetization $M_{30}$ of the second ferromagnetic layer 30. When an area of the first magnetic domain 12A in a portion overlapping the second ferromagnetic layer 30 in the plan view from the z direction becomes large, the resistance value of the magnetic domain wall movement element 100 becomes low. In contrast, when an area of the second magnetic domain 12B in a portion overlapping the second ferromagnetic layer 30 in the plan view from the z direction becomes large, the resistance value of the magnetic domain wall movement element 100 becomes high.

The magnetization of the first ferromagnetic layer 12 is more likely to change in an orientation direction than the magnetization of the second ferromagnetic layer 30 when a prescribed external force has been applied. The prescribed external force is, for example, an external force applied to the magnetization by an external magnetic field or an external force applied to the magnetization by a spin polarization current. The first ferromagnetic layer 12 may be referred to as a magnetization free layer.

The first ferromagnetic layer 12 contains a ferromagnetic material. The first ferromagnetic layer 12 contains, for example, a material that easily obtains a coherent tunnel effect with the second ferromagnetic layer 30. The first ferromagnetic layer 12 includes, for example, a metal selected from the group consisting of Cr, Mn, Co, Fe, and Ni, an alloy containing one or more selected from the above-described metals, an alloy containing the above-described metals and at least one or more elements selected from B, C, and N, and the like. The first ferromagnetic layer 12 is, for example, Co—Fe, Co—Fe—B, or Ni—Fe.

The first ferromagnetic layer 12 may be, for example, a Heusler alloy. The Heusler alloy is a half metal and has high spin polarizability. The Heusler alloy is an intermetallic v compound having a chemical composition of XYZ or $X_2YZ$, wherein X is a transition metal element or a noble metal element of the Co, Fe, Ni, or Cu group on the periodic table, Y is a transition metal of the Mn, V, Cr, or Ti group or an elemental species of X, and Z is a typical element of Group III to Group V. Examples of the Heusler alloy include $Co_2FeSi$, $Co_2FeGe$, $Co_2FeGa$, $CoIMnSi$, $Co_2Mn_{1-a}Fe_aAl_bS_{1-b}$, $Co_2FeGe_{1-c}Ga_c$, and the like.

The underlayer 16 is located on the magnetic recording layer 14 opposite to the first ferromagnetic layer 12. The underlayer 16 consists of a nonmagnetic material. The underlayer 16 is a layer for defining the crystal structure of the magnetic recording layer 14. When the underlayer 16 has a prescribed structure, the crystallinity of the magnetic recording layer 14 is improved and the orientation of the magnetization of the magnetic recording layer 14 is improved. The prescribed structure depends on the crystal structure of the magnetic recording layer 14, and is, for example, amorphous, a (001)-oriented NaCl structure, a (002)-oriented perovskite structure represented by the composition formula of $ABO_3$, or a (001)-oriented tetragonal or cubic crystal structure.

The underlayer 16 is a conductor or an insulator. The underlayer 16 is preferably a conductor. When the underlayer 16 is a conductor, the thickness of the underlayer 16 is preferably thinner than the thickness of the magnetic recording layer 14. When the thickness of the underlayer 16 is thick, most of the electric current flowing through the wiring layer 10 flows through the underlayer 16 and the amount of electric current required to move the magnetic domain wall 17 increases. The underlayer 16 contains, for example. Ta, Ru, Pt, Ir, Rh, W, Pd, Cu, Au, and Cu.

The wiring layer 10 may not include the first ferromagnetic layer 12. In this case, the resistance value of the magnetic domain wall movement element 100 changes with a relative angle difference between the magnetization of the magnetic recording layer 14 and the magnetization of the second ferromagnetic layer 30. In this case, the magnetic recording layer 14 preferably consists of a material which easily obtains a coherent tunneling effect with the second ferromagnetic layer 30 and has a large coercive force at which the moving speed of the magnetic domain wall 17 becomes slow therewith. Also, the wiring layer 10 may not include the underlayer 16.

Figure 4:
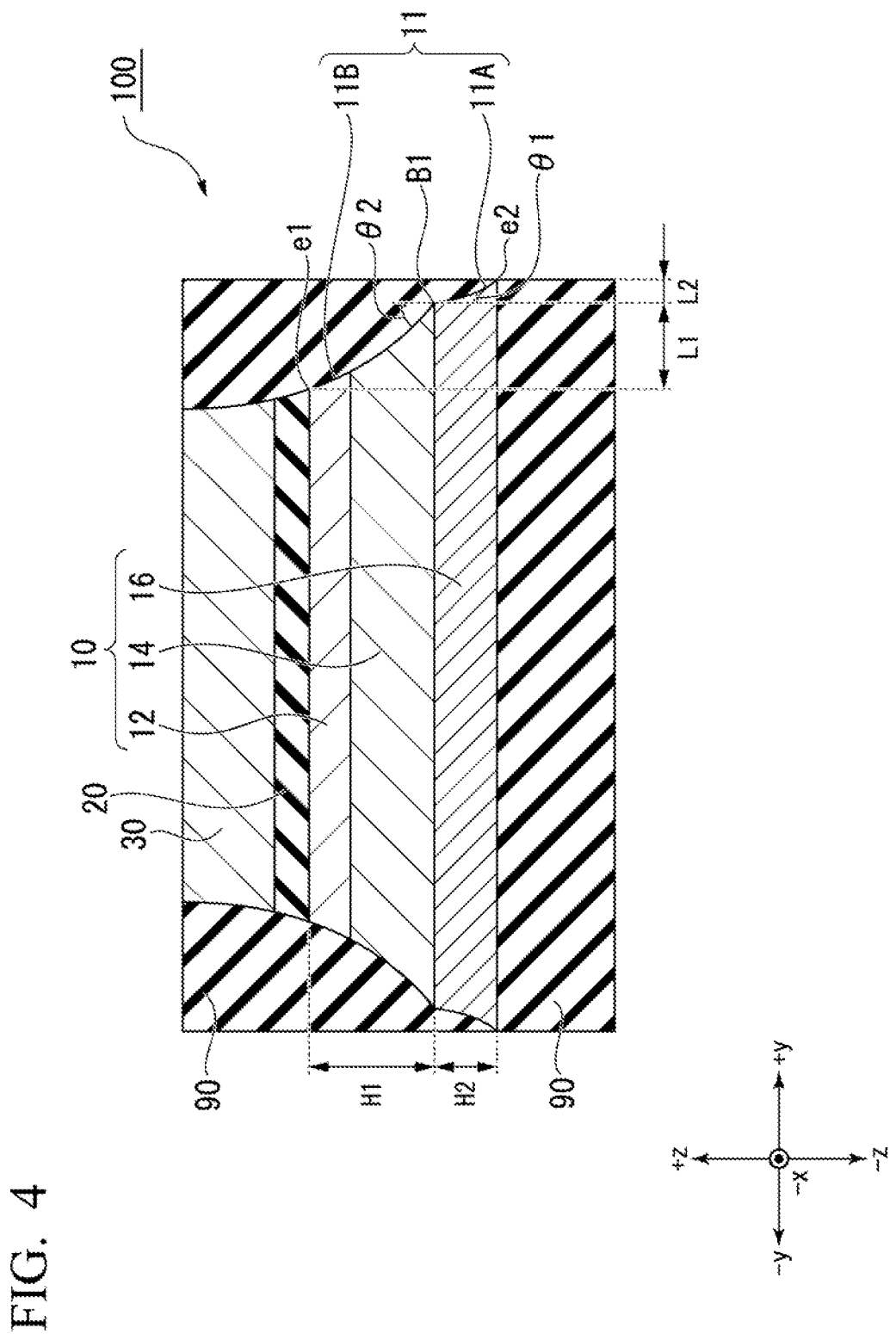
FIG. 4 is a cross-sectional view of the magnetic domain wall movement element according to the first embodiment in a yz plane.

FIG. 4 is a cross-sectional view of the magnetic domain wall movement element 100 cut along the A-A plane in FIG. 3. The side surface 11 of the wiring layer 10 is inclined in the y direction with respect to the z direction. The side surface 11 includes one or more bending points. The bending point is a point where the inclination angle with respect to the z direction is discontinuous. Discontinuity means that the inclination angle of the tangent line of the side surface 11 is not constant or does not change continuously.

The bending point is specifically confirmed in the following procedure. First, the cross section of the magnetic domain wall movement element 100 is imaged with a transmission electron microscope (TEM). Although the transmission electron microscope image depends on a size of the magnetic domain wall movement element 100, the imaging of the transmission electron microscope is performed at a magnification at which the shape of the side surface 11 can be sufficiently confirmed. Subsequently, the brightness of the portion of the insulating layer 90 and the brightness of the portion of the magnetic recording layer 14 are extracted, and an intermediate value thereof is defined. The captured image is binarized by setting the intermediate value as the threshold value. Subsequently, the inclination angle of the tangent line of the side surface 11 in the binarized image is obtained at each of 10 points obtained by dividing the side surface 11 into 10 equal parts in the y direction. A position of the measurement point and the inclination angle at the measurement point are plotted on a graph. When an approximate straight line is bent at a point on the way, this point becomes the bending point.

A bending point at a position farthest from the nonmagnetic layer 20 is referred to as a first bending point B1. The side surface 11 shown in FIG. 4 has one bending point and this bending point becomes the first bending point B1. Also, an inclined surface away from the nonmagnetic layer 20 with respect to the first bending point B1 is referred to as a first inclined surface 11A and an inclined surface toward the nonmagnetic layer 20 with respect to the first bending point B1 is referred to as a second inclined surface 118B. The first inclined surface 11A and the second inclined surface 11B sandwich the first bending point B1. In the magnetic domain wall movement element 100 shown in FIG. 4, the first bending point B1 is located at the boundary between the magnetic recording layer 14 and the underlayer 16.

The first inclined surface 11A and the second inclined surface 11B may be flat surfaces or curved surfaces. When the first inclined surface 11A and the second inclined surface 11B are flat surfaces, the first inclined surface 11A and the second inclined surface 11B becomes straight lines in a yz plane. When the first inclined surface 11A and the second inclined surface 11B are curved surfaces, the first inclined surface 11A and the second inclined surface 11 become curved lines in the yz plane. FIG. 4 illustrates a case in which the first inclined surface 11A and the second inclined surface 11B are curved surfaces.

An inclination angle θ1 of the first inclined surface 11A with respect to the z direction is smaller than an inclination angle θ2 of the second inclined surface 11B with respect to the z direction. Here, when the first inclined surface 11A and the second inclined surface 11B are curved surfaces, the inclination of the tangent line in the vicinity of the first bending point B1 with respect to the z direction is set as the inclination angle θ1 or θ2.

Also, for example, a distance L1 between the first bending point B1 and the end portion e1 of the nonmagnetic layer 20 in the y direction is longer than a distance L2 between the first bending point B1 and the end portion e2 of the wiring layer 10 in the y direction. Also, for example, a height H1 between the first bending point B1 and the end portion e1 of the nonmagnetic layer 20 in the z direction is longer than a height H2 between the first bending point B1 and the end portion e2 of the wiring layer 10 in the z direction. The heights H1 and H2 in the z direction are distances of perpendicular lines drawn from the end portions e1 and e2 to the xy plane passing through the first bending point BJ.

Figure 5:
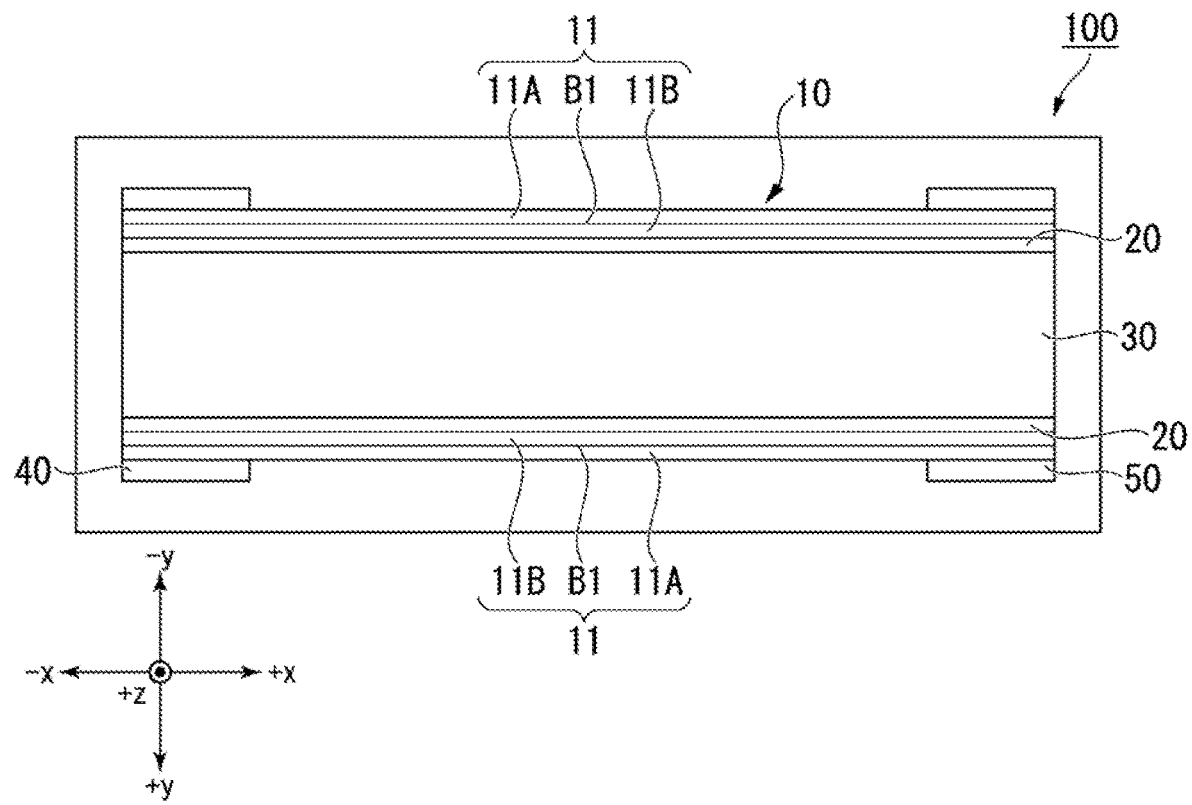
FIG. 5 is a plan view of the magnetic domain wall movement element according to the first embodiment.

FIG. 5 is a plan view of the magnetic domain wall movement element 100. The first bending point B1 extends in the x direction. The fact that the first bending point B1 extends in the x direction means that the wiring layer 10 has the first bending point B1 irrespective of a position where the wiring layer 10 is cut along the yz plane in the x direction. Also, the first bending point B1 is continuous in the x direction. The fact that the first bending point B1 is continuous in the x direction means that the first bending point B1 can be confirmed as a continuous straight line or curve in a plan view from the z direction. Also, in FIG. 5, the first bending point BJ can be confirmed as a straight line along the x direction. When positions of the first bending point B1 in the y direction and the z direction are constant, the first bending point B1 is confirmed as a straight line along the x direction.

"Nonmagnetic Layer"

The nonmagnetic layer 20 is located between the wiring layer 10 and the second ferromagnetic layer 30. The nonmagnetic layer 20 is laminated on one surface of the wiring layer 10.

The nonmagnetic layer 20 consists of, for example, a nonmagnetic insulating material, a semiconductor, or a metal. The nonmagnetic insulating material is, for example, $Al_2O_3$, $SiO_2$, $MgO$, $MgAl_2O_4$, and a material in which a part of Al, Si, and Mg is substituted with Zn, Be, and the like in these compounds. These materials have a large bandgap and are excellent in insulating properties. When the nonmagnetic layer 20 consists of a nonmagnetic insulating material, the nonmagnetic layer 20 is a tunnel barrier layer. Nonmagnetic metals are, for example, Cu, Au, Ag, and the like. Nonmagnetic semiconductors are, for example, Si, Ge, $CuInSe_2$, $CuGaSe_2$, Cu (in, Ga) $Se_2$, and the like.

The thickness of the nonmagnetic layer 20 is, for example, 20 Å (2 nm) or more, preferably 25 Å (2.5 nm) or more, and more preferably 30 Å (3 nm) or more. When the thickness of the nonmagnetic layer 20 is thick, the formation of bending points becomes easy. Also, when the thickness of the nonmagnetic layer 20 is thick, the resistance-area product (RA) of the magnetic domain wall movement element 100 becomes large. The resistance-area product (RA) of the magnetic domain wall movement element 100 is, for example, $1\times10^3$ $\Omega\mu m^2$ or more, preferably $1\times10^4$ $\Omega\mu m^2$ or more, and more preferably $1\times10^5$ $\Omega\mu m^2$ or more. The resistance-area product (RA) of the magnetic domain wall movement element 100 is represented by a product of element resistance of one magnetic domain wall movement element 100 and an element cross-section area of the magnetic domain wall movement element 100 (an area of the cross section obtained by cutting the nonmagnetic layer 20 along the xy plane).

"Second Ferromagnetic Layer"

The second ferromagnetic layer 30 faces the nonmagnetic layer 20. The second ferromagnetic layer 30 has the magnetization Mo oriented in one direction. The orientation direction of the magnetization My of the second ferromagnetic layer 30 is less likely to change than that of the magnetization of the first ferromagnetic layer 12 when a prescribed external force has been applied. The prescribed external force is, for example, an external force applied to magnetization due to an external magnetic field or an external force applied to magnetization due to a spin polarization current. The second ferromagnetic layer 30 may be referred to as a magnetization fixed layer or a magnetization reference layer.

The second ferromagnetic layer 30 consists of a material similar to that of the first ferromagnetic layer 12.

When an easy magnetization axis of the second ferromagnetic layer 30 is in the z direction (a perpendicular magnetization film), the thickness of the second ferromagnetic layer 30 is preferably 1.5 nm or less and more preferably 1.0 nm or less. When the thickness of the second ferromagnetic layer 30 is reduced, perpendicular magnetic anisotropy (interfacial perpendicular magnetic anisotropy) is added to the second ferromagnetic layer 30 at an interface between the second ferromagnetic layer 30 and another layer (the nonmagnetic layer 20) and the magnetization of the second ferromagnetic layer 30 is easily oriented in the z direction.

When the easy magnetization axis of the second ferromagnetic layer 30 is in the z direction (a vertical magnetization film), the second ferromagnetic layer 30 is preferably a laminate of a ferromagnetic material selected from the group consisting of Co, Fe, and Ni and a nonmagnetic material selected from the group consisting of Pt, Pd, Ru, and Rh, and an intermediate layer selected from the group consisting of Ir and Ru is more preferably inserted at any position of the laminate. Vertical magnetic anisotropy can be added by laminating a ferromagnetic material and a nonmagnetic material, and the magnetization of the second ferromagnetic layer 30 can be easily oriented in the z direction by inserting an intermediate layer.

An antiferromagnetic layer may be provided on a surface of the second ferromagnetic layer 30 opposite to the nonmagnetic layer 20 via a spacer layer. The second ferromagnetic layer 30, the spacer layer, and the antiferromagnetic layer have a synthetic antiferromagnetic structure (an SAF structure). The synthetic antiferromagnetic structure includes two magnetic layers sandwiching a nonmagnetic layer. Because the second ferromagnetic layer 30 and the antiferromagnetic layer am antiferromagnetically coupled, the coercive force of the second ferromagnetic layer 30 becomes larger than that when no antiferromagnetic layer is provided. The antiferromagnetic layer is, for example, IrMn, PtMn, or the like. The spacer layer contains, for example, at least one selected from the group consisting of Ru, Ir, and Rh.

"First Conductive Layer and Second Ferromagnetic Layer"

The first conductive layer 40 and the second conductive layer 50 are connected to the wiring layer 10. The first conductive layer 40 and the second conductive layer 50 are, for example, connection portions between the connection wiring Cw and the wiring layer 10. The first conductive layer 40 is connected to, for example, a first end portion of the wiring layer 10, and the second conductive layer 50 is connected to, for example, a second end portion of the wiring layer 10. When the magnetic domain wall movement element 100 does not include the first conductive layer 40 and the second conductive layer 50, the connection wiring Cw and the wiring layer 10 are directly connected.

The first conductive layer 40 and the second conductive layer 50 include, for example, a magnetic material. The direction of magnetization of the first conductive layer 40 is different from the direction of magnetization of the second conductive layer 50. The first conductive layer 40 and the second conductive layer 50 fix the magnetization of the magnetic recording layer 14 in the vicinity of the first conductive layer 40 and the second conductive layer 50. By fixing the magnetization of the magnetic recording layer 14 in the vicinity of the first conductive layer 40 and the magnetization of the magnetic recording layer 14 in the vicinity of the second conductive layer 50 in different directions, the magnetic domain wall 17 is formed in the magnetic recording layer 14.

The first conductive layer 40 and the second conductive layer 50 include, for example, a metal selected from the group consisting of Cr, Mn, Co, Fe, and Ni, an alloy containing one or more selected from the above-described metals, an alloy containing the above-described metals and at least one or more elements selected from B, C, and N, or the like. The first conductive layer 40 and the second conductive layer 50 are, for example, Co—Fe, Co—Fe—B, Ni—Fe, or the like. Also, the first conductive layer 40 and the second conductive layer 50 may have a synthetic antiferromagnetic structure (an SAF structure). The synthetic antiferromagnetic structure includes two magnetic layers sandwiching a nonmagnetic layer. The magnetization of each of the two magnetic layers is fixed and the directions of the fixed magnetization are opposite.

The direction of magnetization of each layer of the magnetic domain wall movement element 100 can be confirmed, for example, by measuring a magnetization curve. The magnetization curve can be measured using, for example, magneto optical Kerr effect (MOKE). The measurement based on the MOKE is a measurement method that is performed by making linearly polarized light incident on an object to be measured and using a magneto-optical effect (a magnetic Kerr effect) in which rotation in the polarization direction or the like occurs.

Next, a method of manufacturing the magnetic recording array 200 will be described. The magnetic recording array 200 is formed by a process of laminating layers and a process of processing a part of each layer in a prescribed shape. For the lamination of the layers, a sputtering method, a chemical vapor deposition (CVD) method, an electron beam vapor deposition method (an EB vapor deposition method), an atomic laser deposition method, or the like can be used. The processing of each layer can be performed using photolithography or the like.

First, impurities are doped at a prescribed position in the substrate Sub to form a source region S and a drain region D. Subsequently, a gate insulating film G1 and a gate electrode G are formed between the source region S and the drain region D. The source region S, the drain region D, the gate insulating film G1, and the gate electrode G serve as a transistor Tr.

Subsequently, the insulating layer 90 is formed to cover the transistor Tr. Also, the connection wiring Cw is formed by forming an opening in the insulating layer 90 and filling the opening with a conductor. The first wiring Wp and the second wiring Cm are formed by laminating the insulating layer 90 to a prescribed thickness, forming a groove in the insulating layer 90, and filling the groove with a conductor.

For example, the first conductive layer 40 and the second conductive layer 50 can be formed by laminating a ferromagnetic layer, a nonmagnetic layer, and a ferromagnetic layer are laminated in order on one surface of the insulating layer 90 and the connection wiring Cw and removing a portion other than portions serving as the first conductive layer and the second conductive layer 50. The removed portion is filled with, for example, the insulating layer 90.

Figure 6:
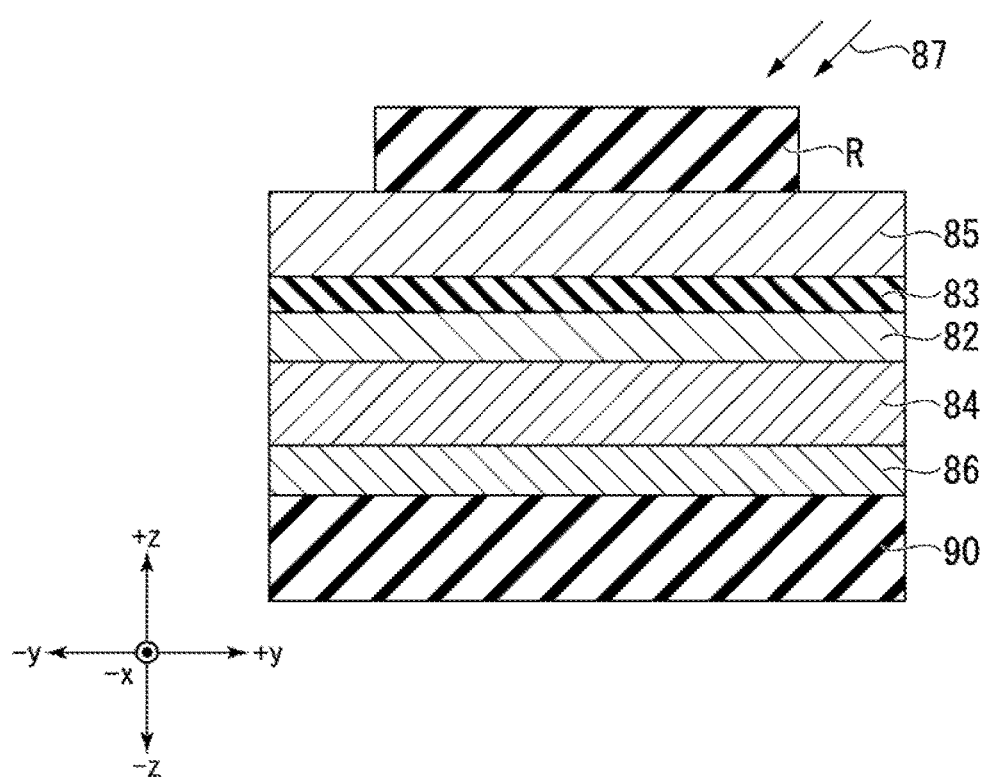
FIG. 6 is a cross-sectional view illustrating a part of a process of manufacturing the magnetic domain wall movement element according to the first embodiment.

FIG. 6 is a cross-sectional view illustrating a part of a process of manufacturing the magnetic domain wall movement element 100 according to the first embodiment. As shown in FIG. 6, the underlayer 86, the ferromagnetic layer 84, the ferromagnetic layer 82, the nonmagnetic layer 83, and the ferromagnetic layer 85 are laminated in order on the insulating layer 90 at a position where the first conductive layer 40 and the second conductive layer 50 are interposed. After processing, the underlayer 86 becomes the underlayer 16, the ferromagnetic layer 84 becomes the magnetic recording layer 14, the ferromagnetic layer 82 becomes the first ferromagnetic layer 12, the nonmagnetic layer 83 becomes the nonmagnetic layer 20, and the ferromagnetic layer 85 becomes the second ferromagnetic layer 30. Subsequently, a resist R is formed on a part of the ferromagnetic layer 85. The resist R is formed to extend in the x direction, for example, according to the shape of the wiring layer 10 to be manufactured.

Subsequently, the laminate is processed in a prescribed shape via the resist R. The processing is performed on the laminate in two steps. In the first processing, an ion beam 87 is radiated to the xy plane in an oblique direction as shown in FIG. 6. For example, the ion beam 87 is radiated to the xy plane in an oblique direction so as to prevent the second ferromagnetic layer 30 and the wiring layer 10 after the processing from being short-circuited when a part of the ferromagnetic layer 85 is attached to the side surface of the nonmagnetic layer 83. It is difficult to perform milling in the shadow region of the resist R and the side surface 81 of the wiring layer 80 is inclined with respect to the z direction (see FIG. 7).

Also, if the thickness of the nonmagnetic layer 83 is increased to increase the resistance-area product (RA), a height position of the resist R with respect to the insulating layer 90 is increased by the increased thickness and a shadow region of the resist R is increased. When the shadow region of the resist R increases, the hem of the wiring layer 80 extends in the y direction.

Figure 7:
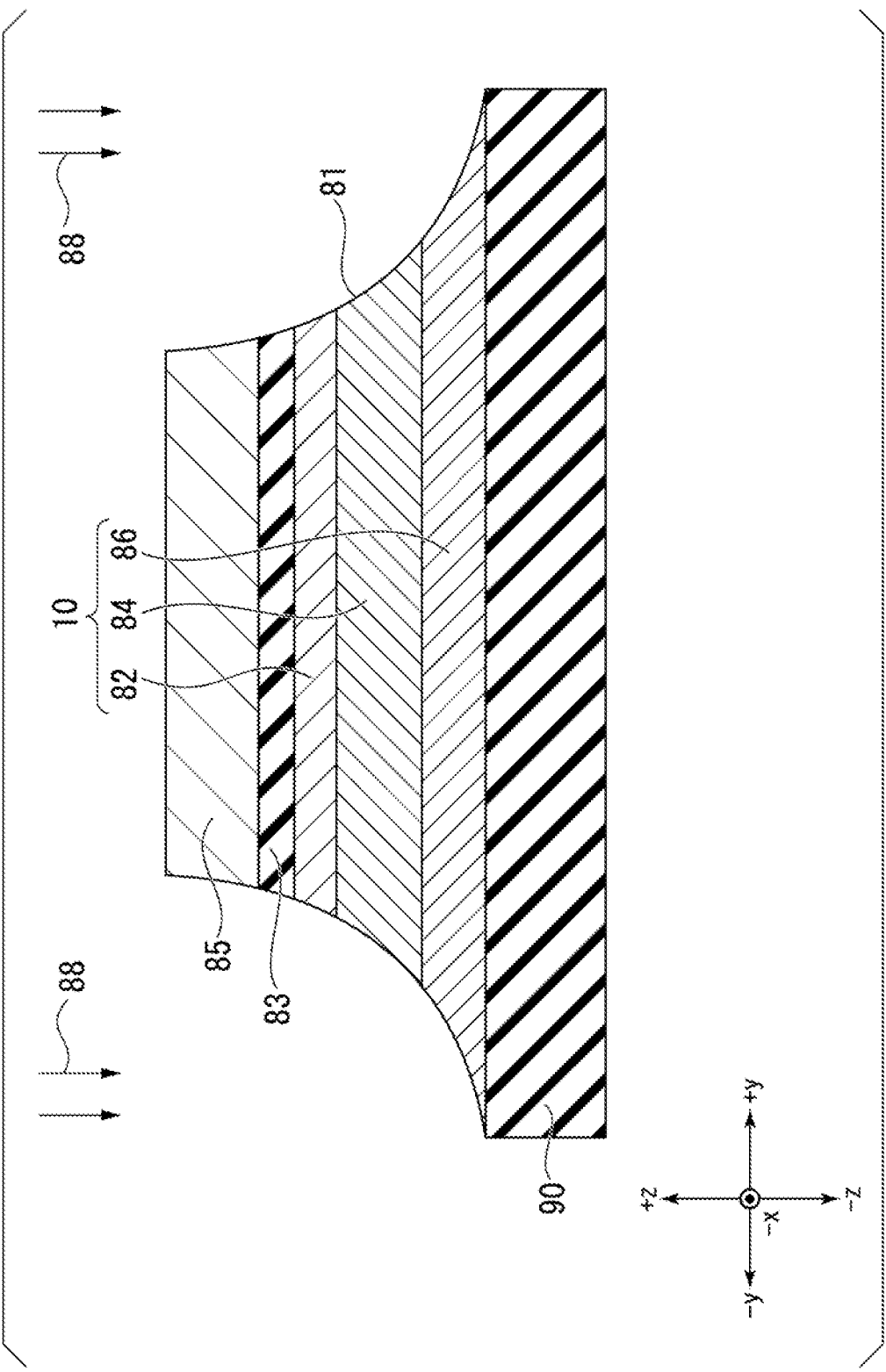
FIG. 7 is a cross-sectional view illustrating a part of a process of manufacturing the magnetic domain wall movement element according to the first embodiment.

FIG. 7 is a cross-sectional view illustrating a part of the process of manufacturing the magnetic domain wall movement element 100 according to the first embodiment. Next, as shown in FIG. 7, the second processing is performed on the laminate. In the second processing, as shown in FIG. 7, an ion beam 88 is radiated toward the hem portion of the wiring layer 80 extending in the y direction. An incident angle of the ion beam 88 with respect to the xy plane (an inclination angle with respect to the z direction) is made smaller than that of the first ion beam 87. For example, the ion beam 88 is radiated substantially perpendicular to the xy plane. A part of the hem of the wiring layer 80 is removed by the ion beam 88. As a result, the magnetic domain wall movement element 100 shown in FIG. 4 is formed. The second inclined surface 11B is formed in the first processing and the first inclined surface 11A is inclined in the second processing. A boundary between the first inclined surface 11A and the second inclined surface 11B becomes the first bending point B1.

The magnetic domain wall movement element 100 according to the first embodiment can reduce an amount of electric current required for writing data to the magnetic domain wall movement element 100.

Figure 8:
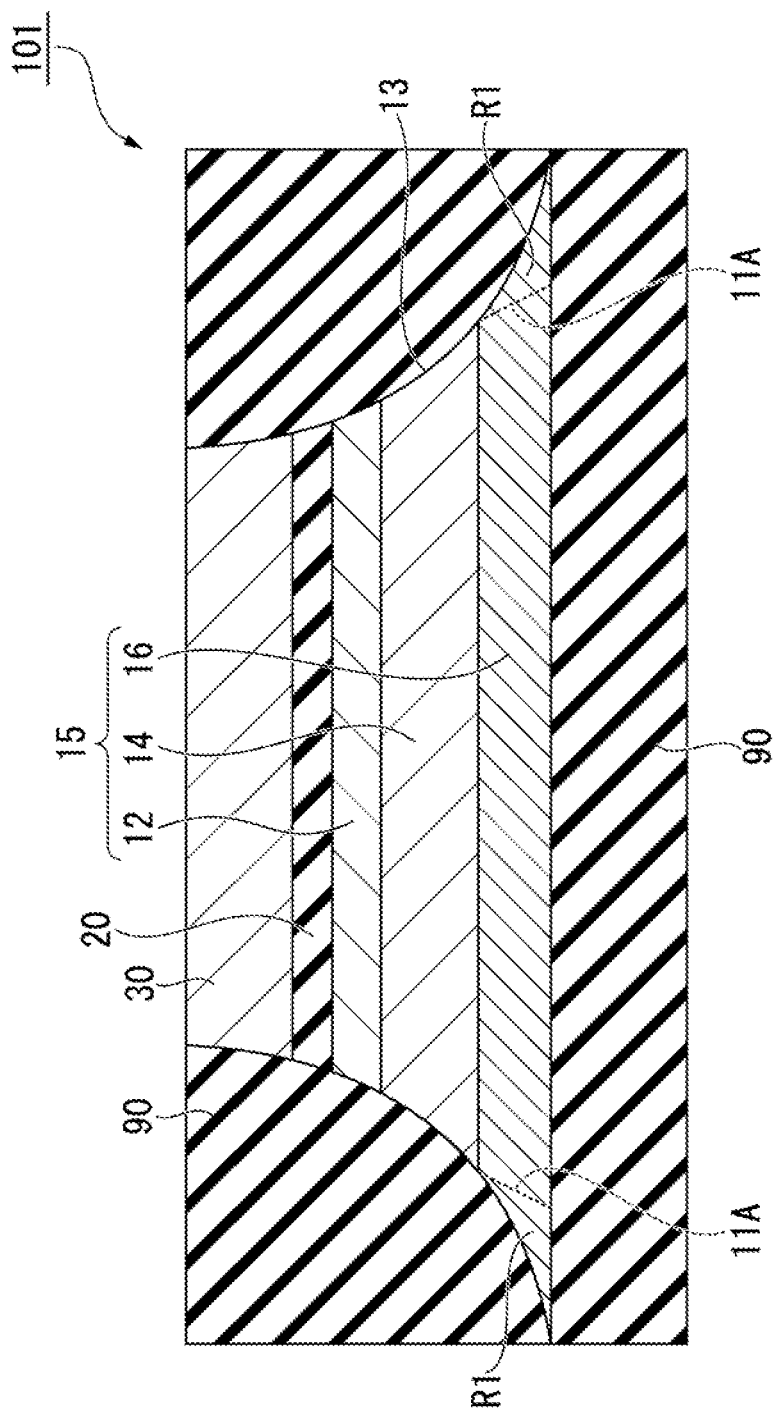
FIG. 8 is a cross-sectional view of a magnetic domain wall movement element according to a comparative example in the yz plane.
Figure 8:
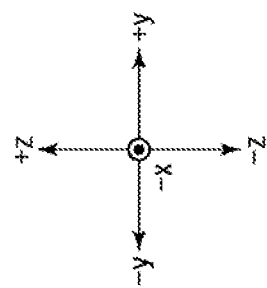

FIG. 8 is a cross-sectional view of a magnetic domain wall movement element 101 according to a comparative example in the yz plane. The magnetic domain wall movement element 101 according to the comparative example is different from the magnetic domain wall movement element 100 according to the first embodiment in that a side surface 13 of a wiring layer 15 does not have a bending point. The magnetic domain wall movement element 101 according to the comparative example has the same shape as shown in FIG. 7 before the second processing. Because the side surface 13 of the wiring layer 15 does not have a bending point, the hem extends in the y direction. The area of the wiring layer 15 is increased by a region R1 as compared with the wiring layer 10 according to the first embodiment. The region R1 corresponds to a portion removed in the second processing in FIG. 7.

When data is written to the magnetic domain wall movement element 100, an electric current flows through the wiring layer 10 in the x direction. The electric current flowing through the wiring layer 10 in the x direction moves the position of the magnetic domain wall 17 and data is written to the magnetic domain wall movement element 100. The magnetic domain wall 17 is moved by reversal of the magnetization of the magnetic recording layer 14. The magnetization is reversed when the electric current flowing through the wiring layer 10 exceeds a reversal current density. The reversal current densities of the magnetic domain wall movement element 100 according to the first embodiment and the magnetic domain wall movement element 101 according to the comparative example are the same. A minimum value of the electric current flowing through the wiring layer 10 or 15 when the magnetization of the magnetic recording layer 14 is reversed is a value obtained by multiplying the reversal current density by cross-sectional area of the wiring layer 10 or 15. The magnetic domain wall movement element 100 according to the first embodiment can decrease an amount of electric current flowing through the wiring layer 10 by an amount of electric current corresponding to the region R1 as compared with the magnetic domain wall movement element 101 according to Comparative Example 1.

In many cases, the magnetic domain wall movement element 100 is integrated and used as a magnetic memory. As the amount of electric current required for writing data to each magnetic domain wall movement element 100 increases, the power consumption of the magnetic memory increases. The power consumption of one magnetic domain wall movement element 100 can be decreased by about 5% only by decreasing the amount of electric current flowing through the region R1. The magnetic memory is a collection of a large number of magnetic domain wall movement elements 100 and the overall power consumption of the magnetic memory can be significantly decreased only by decreasing an amount of electric current flowing through the region R1.

Also, if the position of the first bending point B1 is set at the boundary between the magnetic recording layer 14 and the underlayer 16, the probability of occurrence of a defect in the magnetic domain wall movement element 100 can be reduced and the yield at the time of manufacturing can be improved. As an example of the defect of the magnetic domain wall movement element 100, there is a short circuit between the first ferromagnetic layer 12 and the second ferromagnetic layer 30. One of the major causes of the short circuit is that the adhesion of a conductive adhesion substance to the side surface of the nonmagnetic layer 20. In many cases, the conductive adhesion substance adheres during the second processing on the laminate. For example, by irradiating the conductive layer with the ion beam 88, a conductive substance is scattered and adheres to the side surface of the nonmagnetic layer 20. The underlayer 16 is farther from the nonmagnetic layer 20 than the magnetic recording layer 14. Thus, a scattering substance when the underlayer 16 is processed is unlikely to adhere to the side surface of the nonmagnetic layer 20.

Also, it is possible to limit the local concentration of the magnetic field by setting the position of the first bending point B1 at the boundary between the magnetic recording layer 14 and the underlayer 16. The bending point is a corner portion formed on the side surface 11. A magnetic field tends to concentrate on the corner portion. The magnetic field affects the magnetization state of the magnetic layer. For example, the magnetization state of the magnetic layer affects a magnetoresistance change ratio (an MR ratio) of the magnetic domain wall movement element 100 and the movement of the magnetic domain wall 17. The underlayer 16 is a nonmagnetic material and it is possible to limit local concentration of the magnetic field when there is a bending point at the interface between the underlayer 16 and the magnetic recording layer 14.

Also, it is possible to restrict the magnetization of the magnetic recording layer 14 and the first ferromagnetic layer 12 from being disturbed by setting the position of the first bending point B1 at the boundary between the magnetic recording layer 14 and the underlayer 16. Magnetization is strongly affected by the interface. The inclination angle of the side surface 11 changes with the bending point as a boundary. When the bending point is located on the side surface of the magnetic recording layer 14 or the first ferromagnetic layer 12, the magnetization state in the vicinity thereof is disturbed as the inclination angle of the inclined surface changes, and the stability of the data deteriorates. The underlayer 16 is a nonmagnetic material and disturbance of magnetization can be limited if there is a bending point at the interface between the underlayer 16 and the magnetic recording layer 14.

Also, the position of the first bending point B1 is set at the boundary between the magnetic recording layer 14 and the underlayer 16, so that it is possible to improve the stability of magnetization of the magnetic recording layer 14 and the first ferromagnetic layer 12 and improve the stability of data. Pinning sites are formed on the side surfaces of the magnetic recording layer 14 and the first ferromagnetic layer 12 during processing. The pinning sites try to maintain the magnetization oriented in a prescribed direction. The pinning site is, for example, a mixing layer formed during processing. When the magnetization is maintained in a prescribed direction, magnetization reversal does not occur even if an unexpected external force or the like is applied, and data can be stably retained for a long period of time.

Also, the position of the first bending point B1 is set at the boundary between the magnetic recording layer 14 and the underlayer 16, so that the reversal current density of the magnetic domain wall movement element 100 can be reduced. In the vicinity of the first bending point B1, mixing of materials occurs during processing and some of the magnetic elements contained in the magnetic recording layer 14 may be contained in the underlayer 16. The magnetic element contained in the underlayer 16 becomes a spin scattering factor and the spin-orbit interaction strongly acts on the underlayer 16. The spin-orbit interaction induces a spin Hall effect and causes a spin current to be generated in a direction (the z direction) orthogonal to an electric current flow direction. The spin current injects spin from the underlayer 16 into the magnetic recording layer 14 and gives a spin-orbit torque to the magnetization of the magnetic recording layer 14. The spin-orbit torque assists the magnetization reversal of the magnetic recording layer 14 and the first ferromagnetic layer 12, and the reversal current density of the magnetic domain wall movement element 100 decreases.

Also, if a distance L1 between the first bending point B1 and the end portion cl of the nonmagnetic layer 20 is longer than a distance L2 between the first bending point B1 and the end portion e2 of the wiring layer 10, it is possible to reduce a probability of occurrence of a defect of the magnetic domain wall movement element 100 and reduce an amount of electric current required for writing data. When the distance L1 becomes long, the scattering substance at the time of processing is unlikely to adhere to the side surface of the nonmagnetic layer 20. Also, when the area of the removed region R1 is increased, the distance L2 is shortened. When the area of the region R1 is increased, an amount of electric current flowing through the wiring layer 10 can be reduced by an amount of electric current corresponding to the removed region R1.

When the distance L1 between the first bending point B1 and the end portion e1 of the nonmagnetic layer 20 is longer than the distance L2 between the first bending point B1 and the end portion e2 of the wiring layer 10, the magnetization can be retained more stably. The side surfaces of the magnetic layer (first ferromagnetic layer 12 and magnetic recording layer 14) can be pinning sites. When the region where the magnetization is fixed by the pinning site is wider, the magnetization is more stable and data can be retained more stably. The region where the pinning site is formed depends on a size of a surface area of the magnetic layer exposed during processing. When the distance L1 is longer than the distance L2, the region of the pinning site formed on the magnetic layer becomes large.

Also, if the height H1 between the first bending point B1 and the end portion e1 of the nonmagnetic layer 20 is made longer than the height H2 between the first bending point B1 and the end portion e2 of the wiring layer 10, it is possible to reduce a probability of occurrence of a defect of the magnetic domain wall movement element 100. When the height H1 becomes long, a scattering substance at the time of processing is unlikely to adhere to the side surface of the nonmagnetic layer 20.

Also, if the height H1 between the first bending point B1 and the end portion e1 of the nonmagnetic layer 20 is made longer than the height H2 between the first bending point B1 and the end portion e2 of the wiring layer 10, it is possible to reduce an influence of magnetic noise on the magnetic layers (the first ferromagnetic layer 12 and the magnetic recording layer 14). The bending point is a corner portion formed on the side surface 11. A magnetic field easily concentrates on the corner portion and the different shapes around corner portions disturb the magnetization and magnetic noise occurs. The magnetic noise affects the magnetization state of the magnetic layer. For example, the magnetization state of the magnetic layer affects a magnetoresistance change ratio (an MR ratio) of the magnetic domain wall movement element 100 and the movement of the magnetic domain wall 17. When the height H1 is higher than the height H2, the amount of magnetic material (an amount of magnetization) contained in the range from the bottom surface to the height H2 is relatively small and the disturbance of magnetization is limited.

Although an example of the magnetic recording array 200 and the magnetic domain wall movement element 100 according to the first embodiment has been described in detail, various modifications and changes in the magnetic recording array 200 and the magnetic domain wall movement element 100 according to the first embodiment can be made within the scope of the subject matter of the present invention.

First Modified Example

Figure 9:
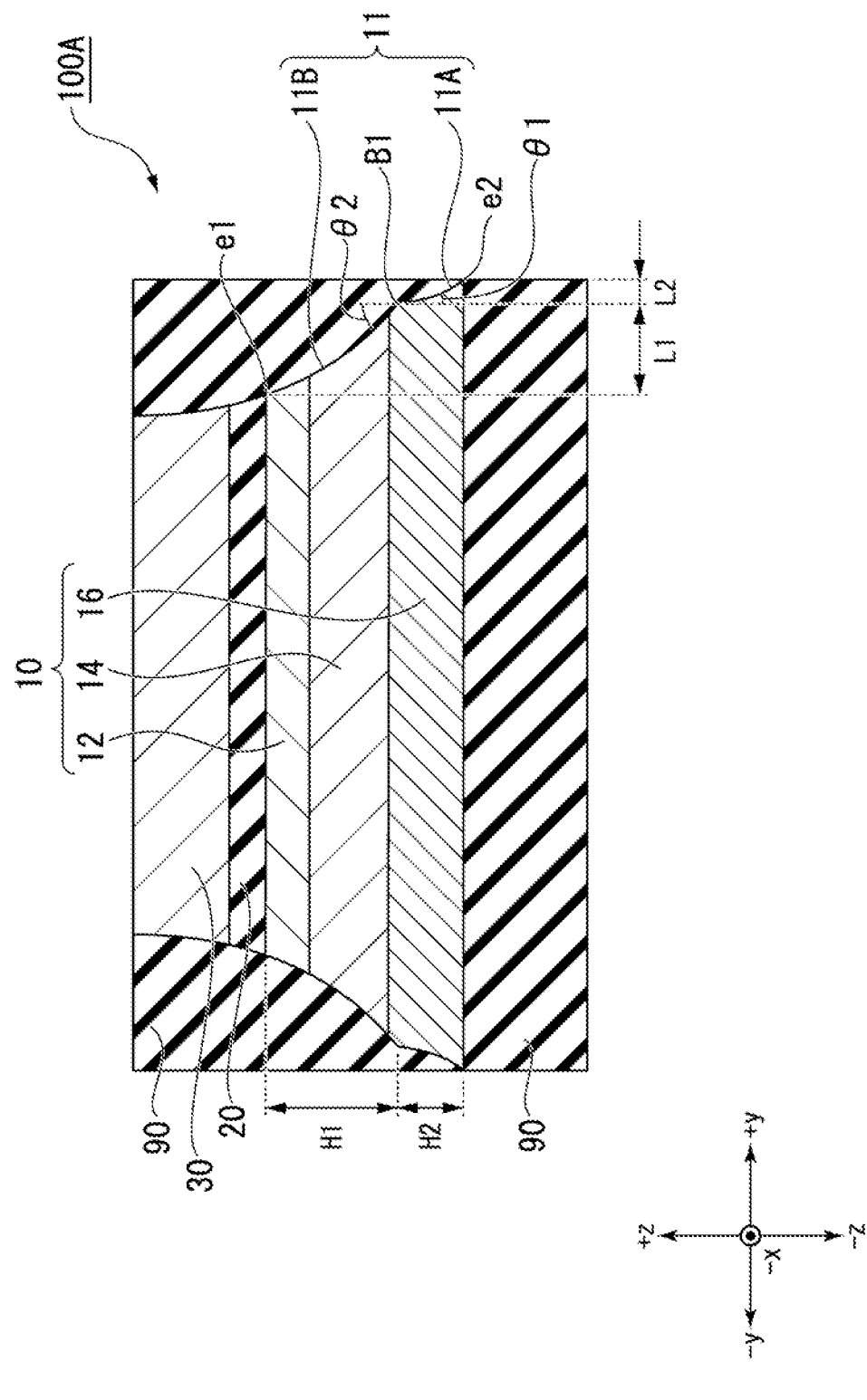
FIG. 9 is a cross-sectional view of the magnetic domain wall movement element according to a first modified example in the yz plane.

FIG. 9 is a cross-sectional view of a magnetic domain wall movement element 100A according to a first modified example in the yz plane. The magnetic domain wall movement element 100A is different from the magnetic domain wall movement element 100 in that a first bending point B1 is located on a side surface of an underlayer 16. Components similar to those of the magnetic domain wall movement element 100 are denoted by the same reference signs and the description thereof will be omitted.

The magnetic domain wall movement element 100A according to the first modified example can reduce the amount of electric current required for writing data. Also, when the first bending point B1 is located on the side surface of the underlayer 16, the adhesion of a scattering substance to a nonmagnetic layer 20 can be limited and the probability of occurrence of a defect in the magnetic domain wall movement element 100A can be reduced. Also, because the underlayer 16 is a nonmagnetic material, it is possible to limit the local concentration of the magnetic field at the bending point, and it is possible to limit the disturbance of the magnetization of a magnetic recording layer 14 and a first ferromagnetic layer 12.

When the first bending point B1 is located on the side surface of the underlayer 16, the reversal current density of the magnetic domain wall movement element 100 can be reduced. In the vicinity of the bending point, the symmetry of the crystal structure is broken. The symmetry breaking of the crystal structure creates an internal field within the underlayer 16 and the spin-orbit interaction strongly acts on the underlayer 16. The spin-orbit interaction induces a spin Hall effect and causes a spin current to be generated in a direction (the z direction) orthogonal to an electric current flow direction. The spin current injects spin from the underlayer 16 into the magnetic recording layer 14 and gives a spin-orbit torque to the magnetization of the magnetic recording layer 14. The spin-orbit torque assists the magnetization reversal of the magnetic recording layer 14 and the first ferromagnetic layer 12 and the reversal current density of the magnetic domain wall movement element 100A decreases.

Second Modified Example

Figure 10:
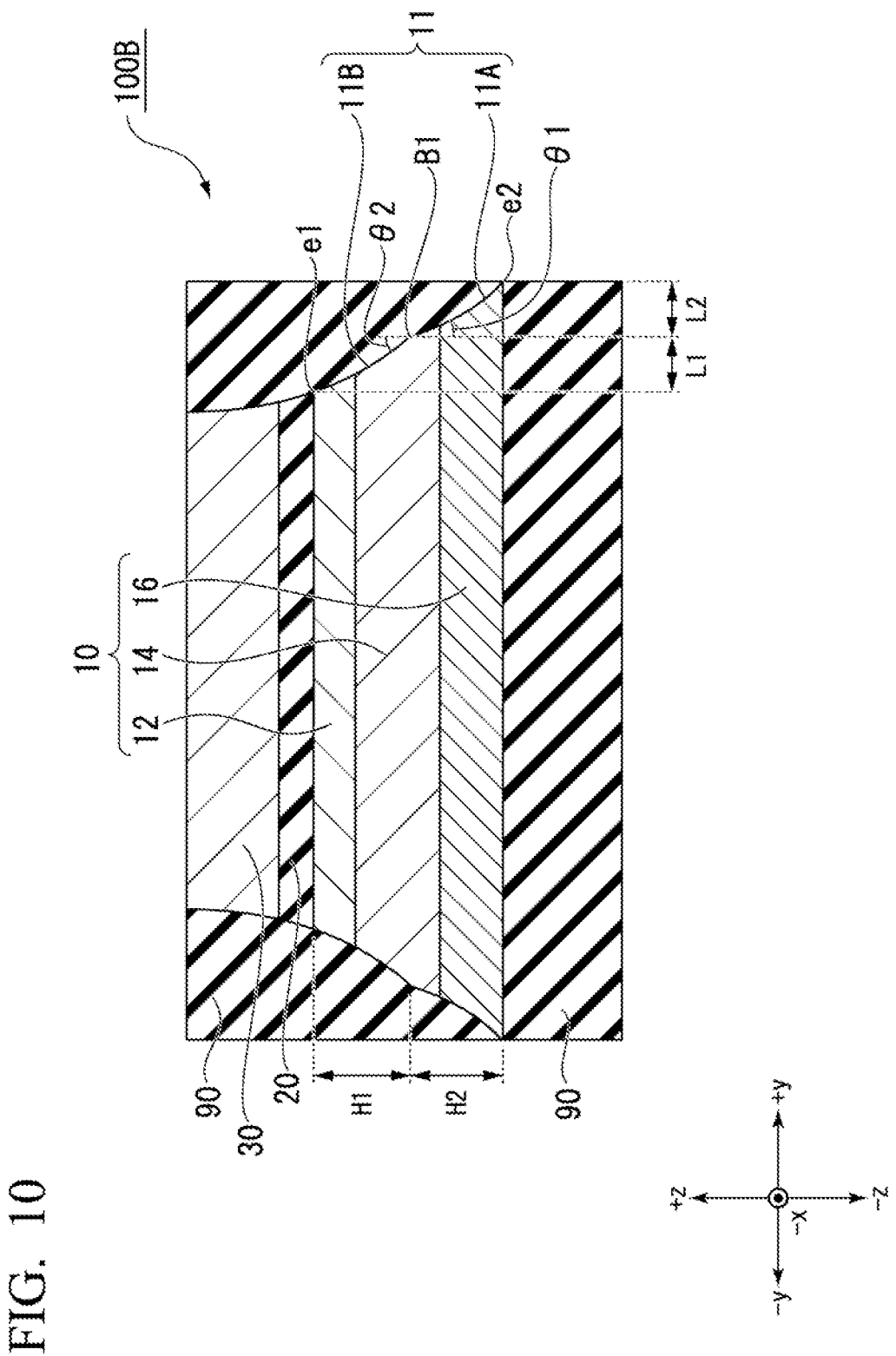
FIG. 10 is a cross-sectional view of the magnetic domain wall movement element according to a second modified example in the yz plane.

FIG. 10 is a cross-sectional view of a magnetic domain wall movement element 100B according to a second modified example in the yz plane. The magnetic domain wall movement element 100B is different from the magnetic domain wall movement element 100 in that a first bending point B1 is located on a side surface of a magnetic recording layer 14. Components similar to those of the magnetic domain wall movement element 100 are denoted by the same reference signs and the description thereof will be omitted.

The magnetic domain wall movement element 100B according to the second modified example can reduce the amount of electric current required for writing data. Also, when the first bending point B1 is located on the side surface of the magnetic recording layer 14, the moving speed of a magnetic domain wall 17 can be reduced. The vicinity of the bending point becomes a pinning site due to an influence of mixing and the movement of the magnetic domain wall 17 becomes difficult. When the width of movement of the magnetic domain wall 17 with respect to an external force becomes smaller, the magnetic domain wall movement element 100B can select a plurality of magnetization states and data can be recorded in a larger number of values.

Also, if the first bending point B1 is located on the side surface of the underlayer 16, the magnetic element may be mixed with the underlayer 16 during processing. As described above, the magnetic element becomes a spin scattering factor. When the spins are scattered, the spin-orbit interaction is enhanced and the efficiency of spin current generation with respect to an electric current is improved.

If an amount of magnetic metal addition is too large, the generated spin current may be scattered by the added magnetic metal; and as a result, the spin current may decrease. A molar proportion of the added magnetic metal is preferably sufficiently smaller than a total molar proportion of the elements constituting the spin-orbit torque wiring. The molar proportion of the added magnetic metal is preferably 3% or less of the total proportion. The proportion of the added magnetic metal can be controlled by changing a position of the bending point.

Third Modified Example

Figure 11:
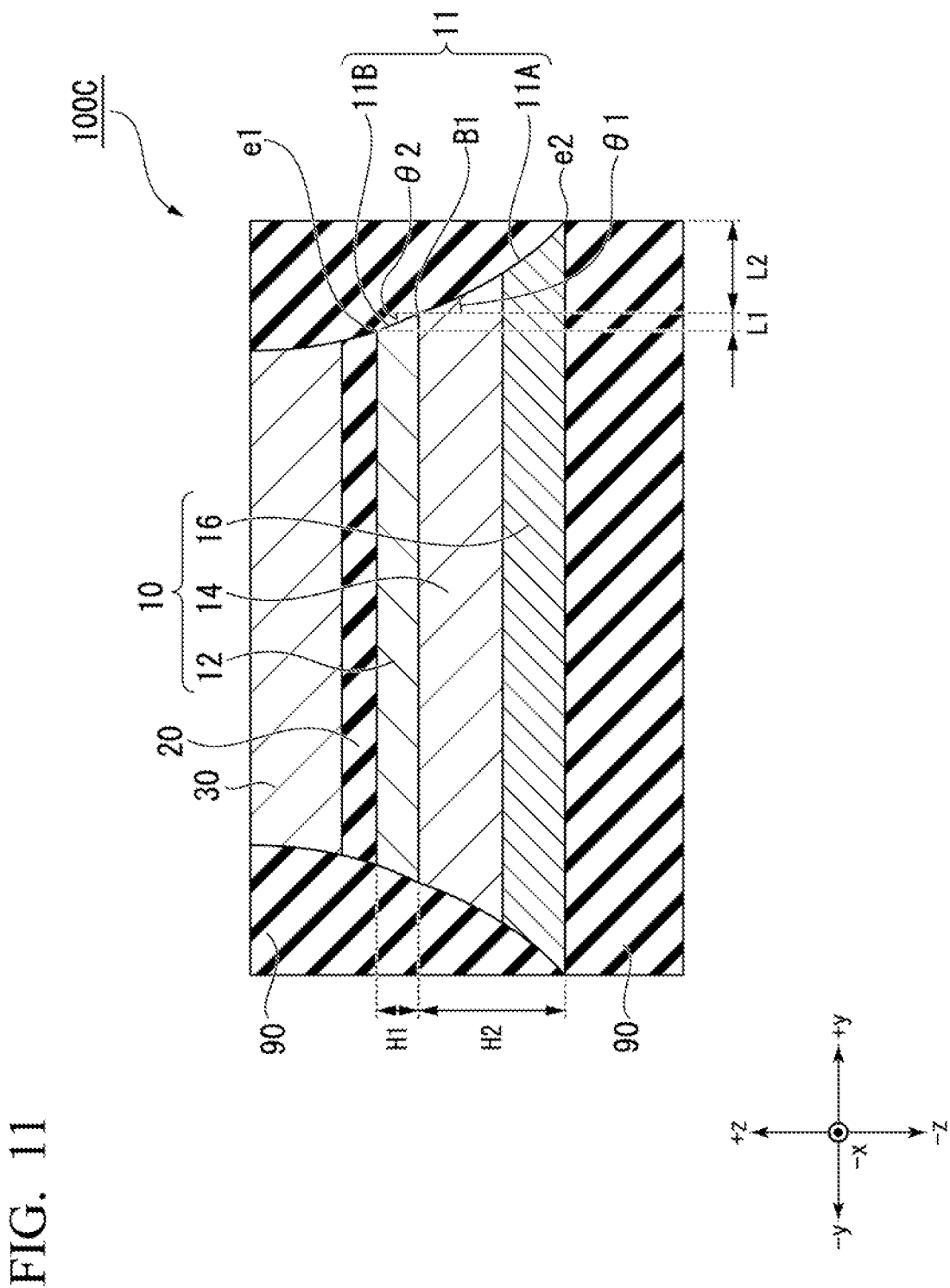
FIG. 11 is a cross-sectional view of the magnetic domain wall movement element according to a third modified example in the yz plane.

FIG. 11 is a cross-sectional view of a magnetic domain wall movement element 100C according to a third modified example in the yz plane. The magnetic domain wall movement element 100C is different from the magnetic domain wall movement element 100 in that a first bending point B1 is located at a boundary between a magnetic recording layer 14 and a first ferromagnetic layer 12. Components similar to those of the magnetic domain wall movement element 100 are denoted by the same reference signs and the description thereof will be omitted.

The magnetic domain wall movement element 100C according to the third modified example can reduce an amount of electric current required for writing data. Also, because the first bending point B1 is located at the boundary between the magnetic recording layer 14 and the first ferromagnetic layer 12, the disturbance of magnetization of the magnetic recording layer 14 and the first ferromagnetic layer 12 can be limited.

Also, because the first bending point B1 is located at the boundary between the magnetic recording layer 14 and the first ferromagnetic layer 12, it is possible to limit a difference in an orientation direction of magnetization within the plane of the magnetic recording layer 14. Magnetization is affected by an interface. The magnetization in the vicinity of a side surface 11 is affected by the side surface 11 and is, for example, inclined from the z direction to the y direction. When the first bending point B1 is located at the boundary between the magnetic recording layer 14 and the first ferromagnetic layer 12, the side surface of the magnetic recording layer 14 belongs to a first inclined surface 11A. An inclination angle θ1 of the first inclined surface 11A with respect to the z direction is smaller than an inclination angle θ2 of a second inclined surface 11B with respect to the z direction. It is possible to reduce a difference in magnetization orientation direction between the center of the magnetic recording layer 14 in the y direction and the vicinity of the first inclined surface 11A by orienting the magnetization along the first inclined surface 11A.

For example, the inclination angle of the magnetization with respect to the z direction becomes smaller toward the center of the magnetic recording layer 14 in the y direction. A region required for the inclination of the magnetization with respect to the z, direction to be eliminated is referred to as a relaxation region. When the inclination angle of the side surface of the magnetic recording layer 14 becomes large, the width of the relaxation region in the y direction becomes large and the relaxation region penetrates into a region overlapping the second ferromagnetic layer 30 in the z direction. When the relaxation region penetrates into a region overlapping the second ferromagnetic layer 30 in the z direction, a magnetoresistance change ratio (an MR ratio) of the magnetic domain wall movement element becomes small. In the magnetic domain wall movement element 100C, a magnetoresistance change ratio (an MR ratio) increases because the first bending point B1 is located at the boundary between the magnetic recording layer 14 and the first ferromagnetic layer 12 and the inclination angle of the side surface of the magnetic recording layer 14 with respect to the z direction is small.

Fourth Modified Example

Figure 12:
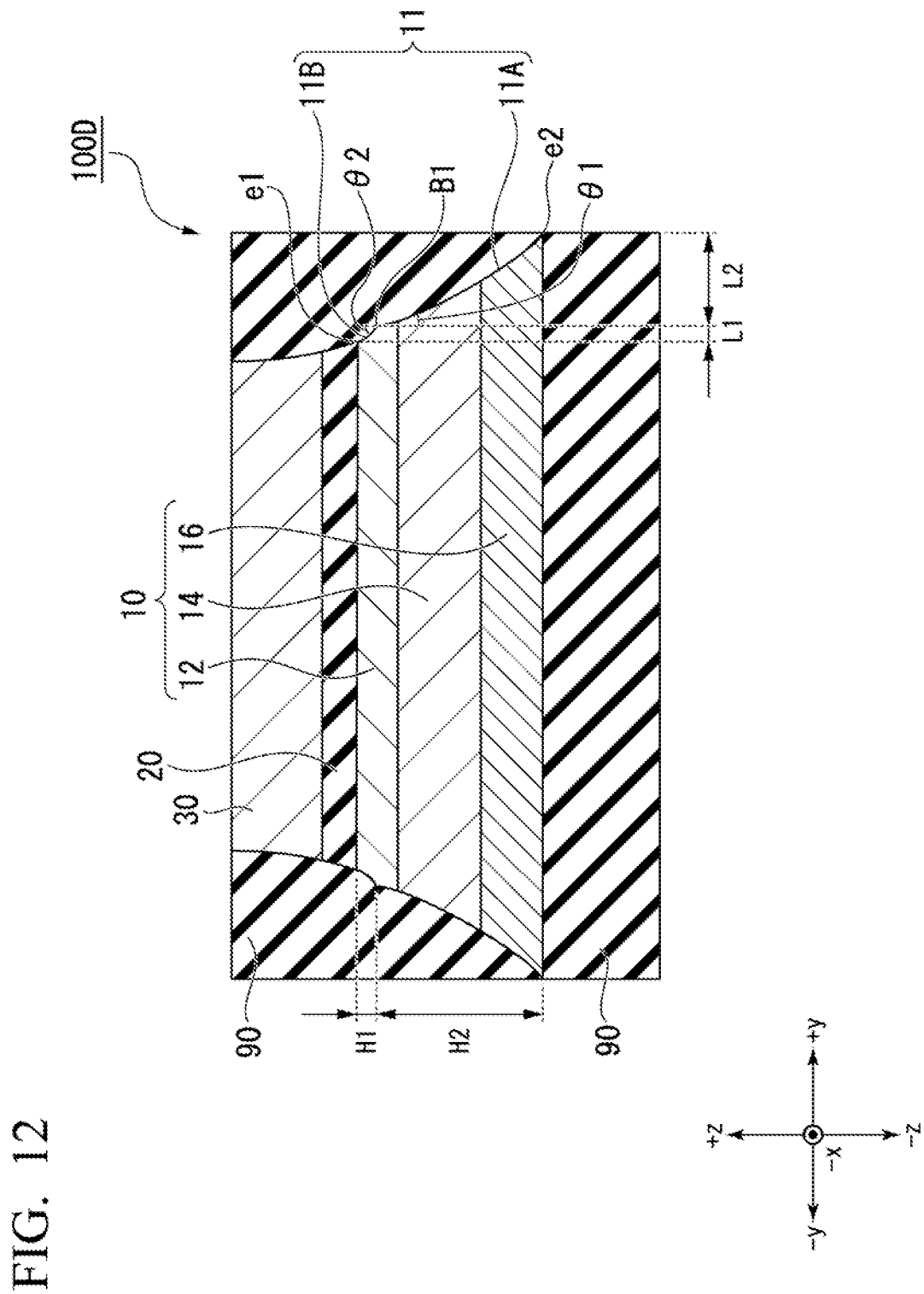
FIG. 12 is a cross-sectional view of the magnetic domain wall movement element according to a fourth modified example in the yz plane.

FIG. 12 is a cross-sectional view of a magnetic domain wall movement element 100D according to a fourth modified example in the yz plane. The magnetic domain wall movement element 100D is different from the magnetic domain wall movement element 100 in that a first bending point B1 is located on a side surface of a first ferromagnetic layer 12. Components similar to those of the magnetic domain wall movement element 100 are denoted by the same reference signs and the description thereof will be omitted.

The magnetic domain wall movement element 100D according to the fourth modified example can reduce an amount of electric current required for writing data. Also, because the first bending point B1 is located on side surface of the first ferromagnetic layer 12, inclination angles of the side surfaces of the first ferromagnetic layer 12 and a magnetic recording layer 14 with respect to the z direction can be reduced and a magnetoresistance change ratio (an MR ratio) can be increased.

Also, when the first bending point B1 is located on the side surface of the first ferromagnetic layer 12, the area of the region R1 to be removed can be increased and the amount of electric current flowing through the wiring layer 10 can be further decreased.

Second Embodiment

Figure 13:
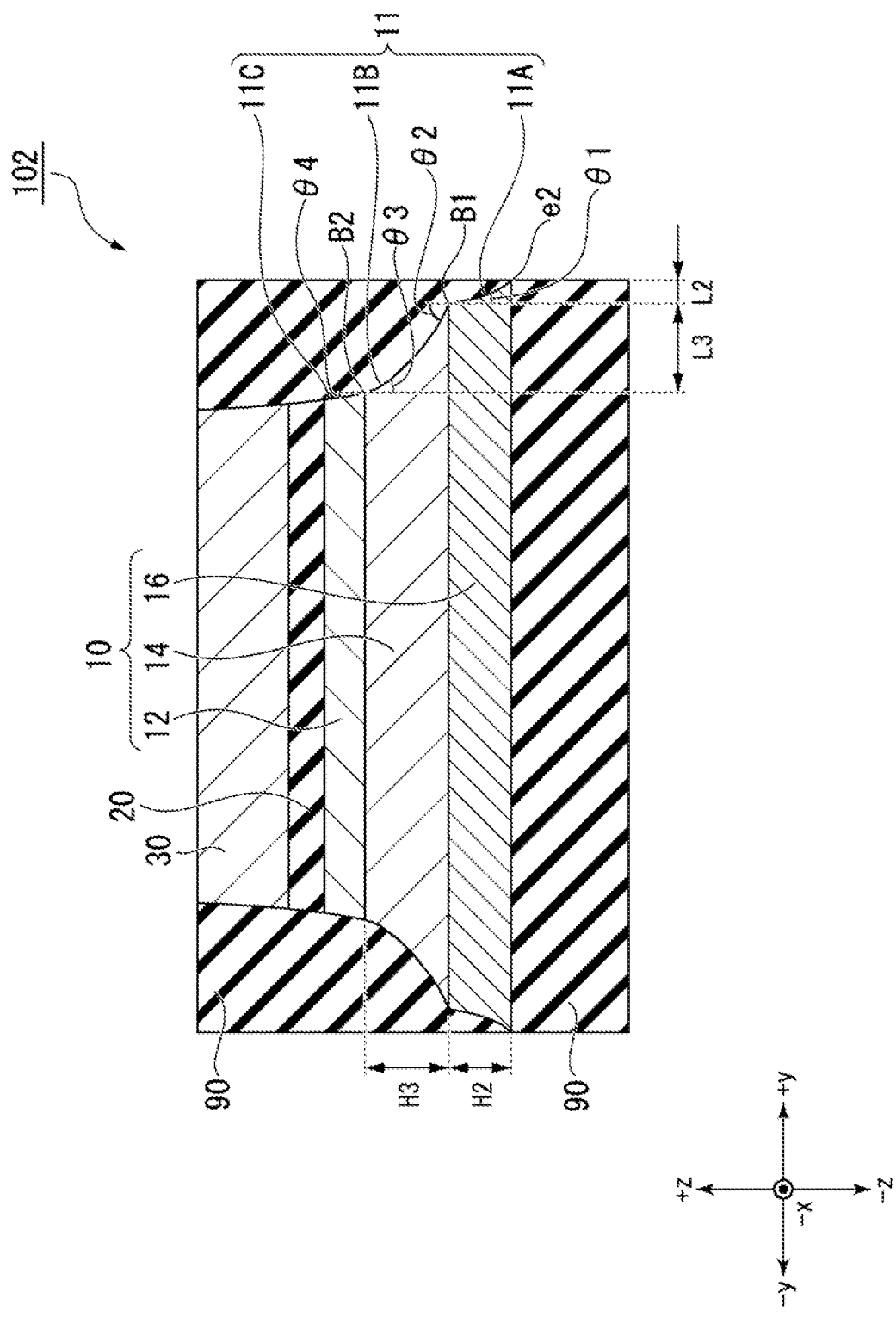
FIG. 13 is a cross-sectional view of a magnetic domain wall movement element according to a second embodiment in the yz plane.

FIG. 13 is a cross-sectional view of a magnetic domain wall movement element 102 according to a second embodiment in the yz plane. The magnetic domain wall movement element 102 is different from the magnetic domain wall movement element 100 in that a side surface 11 has a second bending point B2.

The side surface 11 has two bending points. A bending point at a position farthest from a nonmagnetic layer 20 is referred to as a first bending point B1 and a bending point at a position farthest from the nonmagnetic layer 20 after the first bending point B1 is referred to as the second bending point B2. Also, an inclined surface away from the nonmagnetic layer 20 side with respect to the first bending point B1 is referred to as a first inclined surface 11A, an inclined surface toward the nonmagnetic layer 20 with reference to the first bending point B1 is referred to as a second inclined surface 11B, and an inclined surface toward the nonmagnetic layer 20 side with respect to the second bending point B2 is referred to as a third inclined surface 11C. The second inclined surface 11B is also an inclined surface away from the nonmagnetic layer 20 with respect to the second bending point B2. In the magnetic domain wall movement element 102 shown in FIG. 13, the first bending point B1 is located at a boundary between a magnetic recording layer 14 and an underlayer 16 and the second bending point B2 is located at a boundary between the magnetic recording layer 14 and a first ferromagnetic layer 12.

The first inclined surface 11A, the second inclined surface 11B, and the third inclined surface 11C may be flat surfaces or curved surfaces. FIG. 13 illustrates a case in which the first inclined surface 11A, the second inclined surface 11B, and the third inclined surface 11C are curved surfaces.

An inclination angle θ1 of the first inclined surface 11A with respect to the z direction is smaller than an inclination angle θ2 of the second inclined surface 11B with respect to the z direction. Also, an inclination angle θ3 of the second inclined surface 11B with respect to the z direction is larger than an inclination angle θ4 of the third inclined surface 11C with respect to the z direction. Here, the inclination angle of the second inclined surface 11B with respect to the z direction corresponds to the inclination of the tangent line in the vicinity of the first bending point B1 in the z direction in comparison with the first inclined surface 11A, and the inclination angle of the second inclined surface 11B with respect to the z direction corresponds to the inclination of the tangent line in the z direction in the vicinity of the second bending point B2 in comparison with the third inclined surface 11C.

Also, for example, a distance L3 between the first bending point B1 and the second bending point B2 in the y direction is longer than a distance L2 between the first bending point B1 and an end portion e2 of a wiring layer 10 in they direction. Also, for example, a height H3 between the first bending point B1 and the second bending point 132 in the z direction is longer than a height H2 between the first bending point B1 and the end portion e2 of the wiring layer 10 in the z direction.

For example, the second bending point B2 can be formed according to an etching rate difference between the first ferromagnetic layer 12 and the magnetic recording layer 14 with respect to the ion beams 87 and 88. Also, when the second bending point B2 does not exist at the interface of the layer, it can be formed by performing processing in which the processing is divided into a plurality of processing steps.

The magnetic domain wall movement element 102 according to the second embodiment can reduce an amount of electric current required for writing data. Also, the second bending point B2 is provided, so that it is possible to increase the distance between the first inclined surface 11A and the nonmagnetic layer 20 and restrict a scattering substance front adhering to the side surface of the nonmagnetic layer 20 when the first inclined surface 11A is processed.

Also, a plurality of processing steps are performed to form the bending point, so that it is possible to reduce the probability of occurrence of a defect of the magnetic domain wall movement element 102 and it is possible to improve the yield at the time of manufacturing. When an ion beam is processed in a plurality of processing steps, a scattering substance adhering to the side surface of the nonmagnetic layer 20 in the previous processing step can be removed again in the subsequent processing step. Also, by gradually making an irradiation angle of the ion beam perpendicular to the processed surface, it is possible to remove the scattering substance adhering to the side surface of the nonmagnetic layer 20 while adjusting the shape of the side surface 11. By removing the scattering substance that may cause a short circuit, the probability of occurrence of a defect of the magnetic domain wall movement element 102 is reduced and the yield at the time of manufacturing is improved.

Third Embodiment

Figure 14:
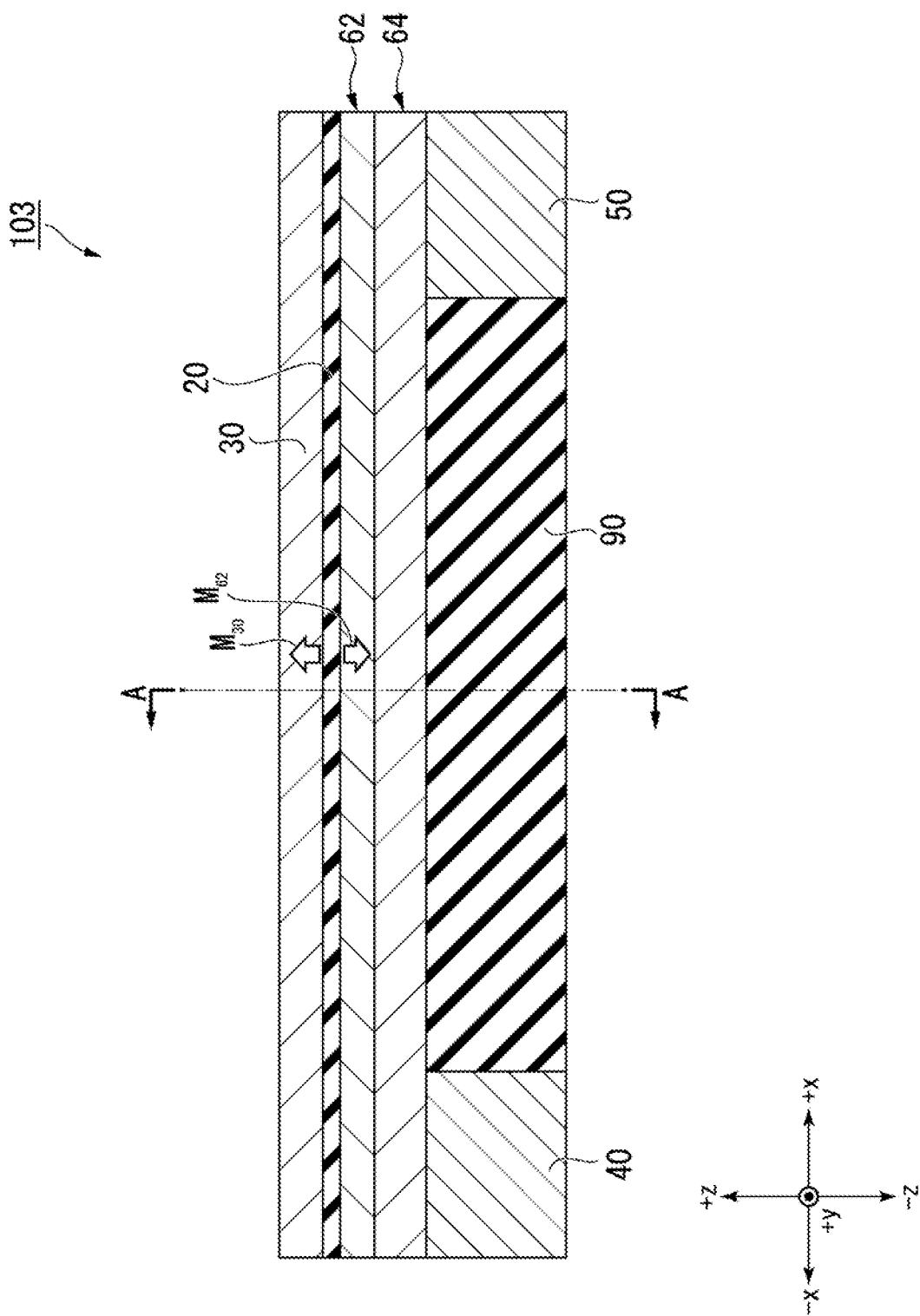
FIG. 14 is a cross-sectional view of a magnetic domain wall movement element according to a third embodiment in the xz plane.

A magnetic memory according to a third embodiment is different in that a magnetic domain wall movement element is replaced with an SOT element. FIG. 14 is a cross-sectional view of an SOT element 103 according to the third embodiment in the xz plane. The SOT element is an example of a magnetic element.

The SOT element 103 includes a wiring layer 60, a nonmagnetic layer 20, a second ferromagnetic layer 30, a first conductive layer 40, and a second conductive layer 50. Components of the nonmagnetic layer 20, the second ferromagnetic layer 30, the first conductive layer 40, and the second conductive layer 50 are similar to those of the magnetic domain wall movement element according to the first embodiment. However, in the case of the SOT element 103, a thickness of the nonmagnetic layer 20 is preferably thinner than that in the case of the magnetic domain wall movement element and the thickness of the nonmagnetic layer 20 is, for example, 20 Å (2 nm) or less.

The wiring layer 60 includes a first ferromagnetic layer 62 and a conductive layer 64. The first ferromagnetic layer 62 and the conductive layer 64 are located close to the nonmagnetic layer 20 in that order.

The first ferromagnetic layer 62 contains a magnetic material and has magnetization M62. The first ferromagnetic layer 62 can use a material similar to that of the second ferromagnetic layer 30. Although a case in which the length of the first ferromagnetic layer 62 in the x direction coincides with that of the conductive layer 64 is shown in FIG. 14, the length of the first ferromagnetic layer 62 in the x direction may be shorter than that of the conductive layer 64.

The conductive layer 64 may be referred to as spin-orbit torque wiring. The conductive layer 64 causes a spin current to be generated due to a spin Hall effect when an electric current flows and injects spin into the first ferromagnetic layer 62. For example, the conductive layer 64 gives a spin-orbit torque (SOT) capable of reversing the magnetization $M_{62}$ of the first ferromagnetic layer 62 to the magnetization $M_{62}$ of the first ferromagnetic layer 62. The magnetization $M_{62}$ of the first ferromagnetic layer 62 receives the spin-orbit torque (SOT) and the reversal of magnetization is performed.

The conductive layer 64 contains any one of a metal, an alloy, an intermetallic compound, a metal boride, a metal carbide, a metal silicide, and a metal phosphide having a function of generating a spin current due to the spin Hall effect when an electric current flows.

The conductive layer 64 contains, for example, a nonmagnetic heavy metal as a main element. The main element is an element having the highest proportion among the elements constituting the conductive layer 64. The conductive layer 64 contains, for example, a heavy metal having a specific gravity of yttrium (Y) or higher. Nonmagnetic heavy metals have a large atomic number of 39 or more and have d-electrons or f-electrons in the outermost shell, so that spin-orbit interaction occurs strongly. The spin Hall effect is generated due to spin-orbit interaction, spins are likely to be unevenly distributed in the conductive layer 64, and spin currents are likely to occur. The conductive layer 64 includes, for example, any one selected from the group consisting of Au, Hf, Mo, Pt, W, and Ta.

Figure 15:
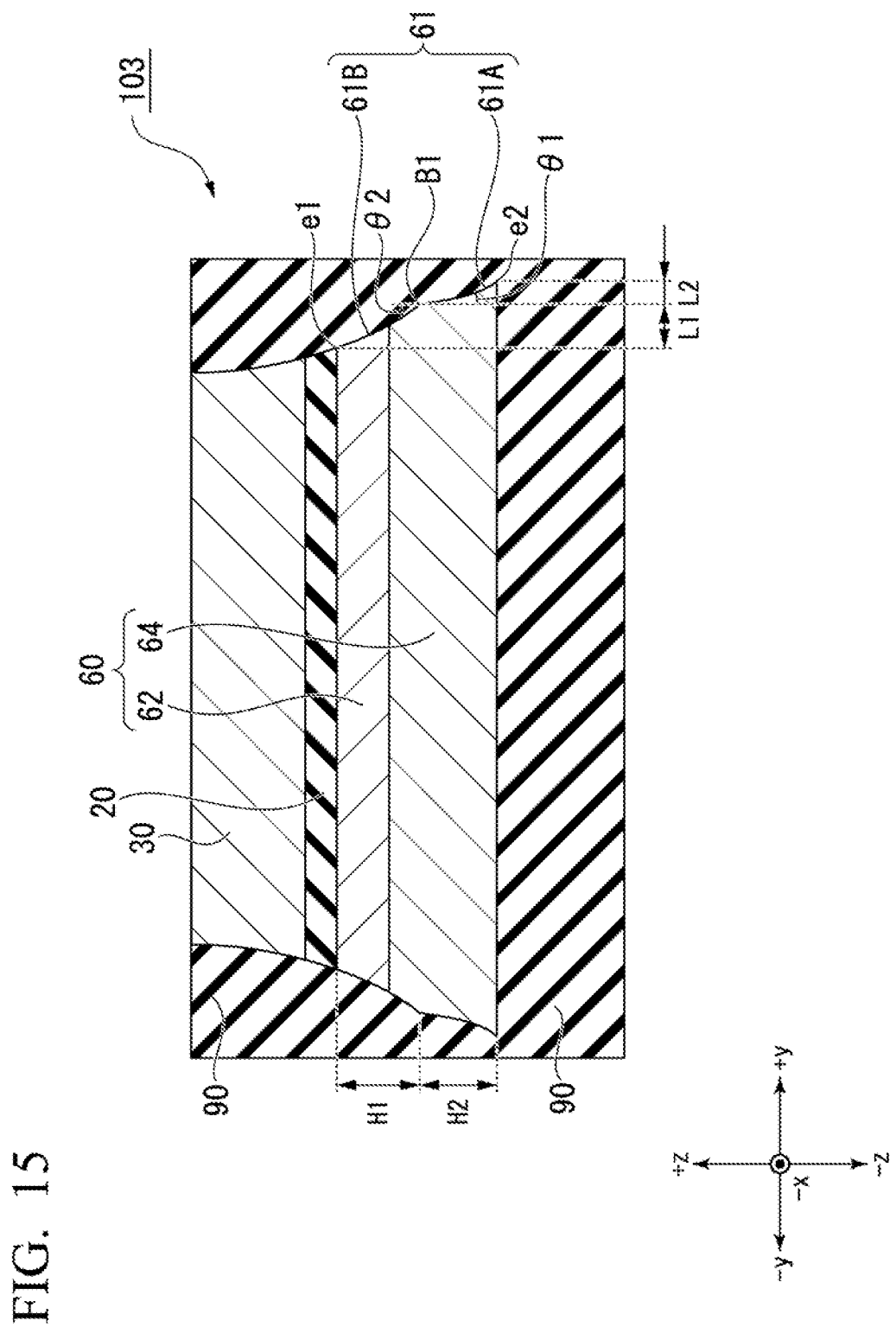
FIG. 15 is a cross-sectional view of the magnetic domain wall movement element according to the third embodiment in the yz plane.

FIG. 15 is a cross-sectional view of the SOT element 103 cut along the A-A plane in FIG. 14. A side surface 61 of the wiring layer 60 is inclined in the y direction with respect to the z direction. The side surface 61 has one or more bending points. Although the side surface 61 shown in FIG. 14 has one first bending point B1, the side surface 61 may have two or more bending points.

The first bending point B1 is interposed between a first inclined surface 61A and a second inclined surface 61B. The first inclined surface 61A is farther from the nonmagnetic layer 20 than the second inclined surface 61B with respect to the first bending point B1. In the SOT element 103 shown in FIG. 15, the first bending point BJ is located on the side surface of the conductive layer 64. The first bending point B1 may be on the side surface of the first ferromagnetic layer 62 or may be at the boundary between the first ferromagnetic layer 62 and the conductive layer 64. The first inclined surface 61A and the second inclined surface 61B may be flat surfaces or curved surfaces.

An inclination angle $\theta 1$ of the first inclined surface 61A with respect to the z direction is smaller than an inclination angle $\theta 2$ of the second inclined surface 61B with respect to the z direction. A positional relationship between the end portion e1 of the nonmagnetic layer 20, the end portion e2 of the wiring layer 60, and the first bending point B1 is similar to that in the case of the magnetic domain wall movement element.

In the case of the SOT element 103, the thickness of the nonmagnetic layer 20 is thin and it is difficult to form a bending point in a method similar to that of the magnetic domain wall movement element 100 according to the first embodiment. In the case of the SOT element 103, for example, a bending point is produced by performed two-step film formation of the wiring layer 60. Specifically, first, a first layer is formed to a thickness that becomes a bending point. After the first layer is processed to form a prescribed shape, the periphery is filled with an insulating layer. Subsequently, a second layer is formed on the first layer and the second layer is processed. The first layer and the second layer are combined to form the wiring layer 60. By performing the film formation and processing in two steps, the shape of the side surface can be freely designed and the bending point can be produced.

When the SOT element 103 has a bending point B1 in the conductive layer 64, a density of an electric current flowing through the conductive layer 64 becomes high and the magnetization $M_{62}$ of the first ferromagnetic layer 62 is easily reversed. Also, when the SOT element 103 has the bending point B1 in the first ferromagnetic layer 62, the inclination of the magnetization $M_{62}$ in the vicinity of the bending point B1 is different from that in the other portions. Thus, the magnetization $M_{62}$ in the vicinity of the bending point B1 triggers the magnetization reversal and the magnetization reversal progresses, so that the magnetization $M_{62}$ of the first ferromagnetic layer 62 is easily reversed.

Although preferred embodiments of the present invention have been described in detail above, the present invention is not limited to the specific embodiments and various modifications and changes can be made within the scope of the subject matter of the present invention described in the claims.

For example, characteristic components in the first to third embodiments may be combined. Although a case in which the second bending point B2 is located at the boundary between the magnetic recording layer 14 and the first ferromagnetic layer 12 has been described as an example, the position of the second bending point B2 is not limited to the position of the boundary. Although a case in which there are one or two bending points has been described above, the number of bending points may be more than two.

Examples

As shown in FIGS. 6 and 7, the underlayer 86, the ferromagnetic layer 84, the ferromagnetic layer 82, the nonmagnetic layer 83, and the ferromagnetic layer 85 were laminated in order, the ion beams 87 and 88 were irradiated in two steps, and a magnetic domain wall movement element was manufactured. A plurality of types of domain wall movement elements were manufactured by changing the thickness of the nonmagnetic layer 83. The nonmagnetic layer 83 was MgO. An RA and an operating current of the obtained domain wall movement element were obtained. The results are shown in Table 1 below.

TABLE 1

| | Thickness of non-magnetic layer (nm) | RA | Bending point | Decrease in electric current |
|---|---|---|---|---|
| Comparative Example 1 | 1.0 | $RA \leq 1 \times 10^2 \ \Omega\mu m^2$ | Absent | Not confirmed |
| Comparative Example 2 | 1.5 | $1 \times 10^2 \ \Omega\mu m^2 < RA \leq 1 \times 10^3 \ \Omega\mu m^2$ | Absent | Not confirmed |
| Embodiment Example 1 | 2.0 | $1 \times 10^3 \ \Omega\mu m^2 < RA \leq 1 \times 10^4 \ \Omega\mu m^2$ | Present | 3% or less |
| Embodiment Example 2 | 2.5 | $5 \times 10^3 \ \Omega\mu m^2 < RA \leq 5 \times 10^4 \ \Omega\mu m^2$ | Present | 5% or more |
| Embodiment Example 3 | 3.0 | $1 \times 10^4 \ \Omega\mu m^2 < RA \leq 1 \times 10^5 \ \Omega\mu m^2$ | Present | 5% or more |
| Embodiment Example 4 | 3.5 | $5 \times 10^4 \ \Omega\mu m2 \leq RA < 5 \times 10^6 \ \Omega\mu m^2$ | Present | 5% or more |
| Embodiment Example 5 | 4.0 | $1 \times 10^6 \ \Omega\mu m^2 \leq RA$ | Present | 5% or more |

In Comparative Examples 1 and 2, the thickness of the nonmagnetic layer was thin and it was difficult to form a bending point in the methods shown in FIGS. 6 and 7. Also, Comparative Examples 1 and 2 had a low RA and were not suitable for a magnetic domain wall movement element (for example, when used as a neuromorphic device).

Although a bending point could be formed in Embodiment Example 1, an inclination angle difference between the first inclined surface and the second inclined surface sandwiching the bending point was small. Thus, the effect of reducing the operating current was smaller than those of Embodiment Examples 2 to 5. Also, Embodiment Example 1 had the minimum RA applicable to the magnetic domain wall movement element.

In Embodiment Examples 2 to 4, a clear bending point could be formed and the effect of reducing the operating current was sufficiently obtained. Also, Embodiment Examples 2 to 4 had an RA suitable for application to a magnetic domain wall movement element.

In Embodiment Example 5, a clear bending point could be formed and the effect of reducing the operating current was sufficiently obtained. On the other hand, the magnetic domain wall movement element of Embodiment Example 5 had a large RA.

EXPLANATION OF REFERENCE SIGNS 10, 15, 60, 80 Wiring layer
11, 13, 61, 81 Side surface
11A, 61A First inclined surface
11B, 61B Second inclined surface
11C Third inclined surface
12, 62 First ferromagnetic layer
12A, 14A First magnetic domain
12B, 14B Second magnetic domain
14 Magnetic recording layer
16, 86 Underlayer
17 Magnetic domain wall
20 Nonmagnetic layer
30 Second ferromagnetic layer
40 First conductive layer
50 Second conductive layer
64 Conductive layer
82, 84, 85 Ferromagnetic layer
83 Nonmagnetic layer
87, 88 Ion beam
90 Insulating layer
100, 100A, 100B, 100C, 100D, 101, 102 Magnetic domain wall movement element
110 First switching element
120 Second switching element
130 Third switching element
200 Magnetic recording array
B1 First bending point
B2 Second bending point
e1, e2 End portion
L1, L2, L3 Distance

What is claimed is:

1. A magnetic element comprising:
a wiring layer extending in a first direction and including a ferromagnetic material; and
a nonmagnetic layer laminated on the wiring layer in a second direction,
wherein the wiring layer includes a side surface inclined with respect to the second direction in a cross section orthogonal to the first direction,
wherein the side surface has one bending point at which an inclination angle with respect to the second direction becomes discontinuous, or the side surface has two bending points at which an inclination angle with respect to the second direction becomes discontinuous,
wherein in a case where the side surface has the one bending point, the one bending point is represented as a first bending point, an inclined surface of the side surface of the wiring layer away from the nonmagnetic layer with respect to the first bending point is represented as a first inclined surface, an inclined surface of the side surface of the wiring layer toward the nonmagnetic layer with respect to the first bending point is represented as a second inclined surface, and an inclination angle of the first inclined surface of the side surface of the wiring layer is smaller than an inclination angle of the second inclined surface of the side surface of the wiring layer in a state in which the first bending point is interposed between the inclination angles, and
wherein in a case where the side surface has the two bending points, a bending point situated at a position farthest from the nonmagnetic layer among the two bending points is represented as a first bending point, the other bending point among the two bending points is represented as a second bending point, an inclined surface of the side surface of the wiring layer away from the nonmagnetic layer with respect to the first bending point is represented as a first inclined surface, an inclined surface of the side surface of the wiring layer, which is toward the nonmagnetic layer with respect to the first bending point and is away from the nonmagnetic layer with respect to the second bending point, is represented as a second inclined surface, an inclined surface of the side surface of the wiring layer toward the nonmagnetic layer with respect to the second bending point is represented as a third inclined surface, and an inclination angle of the first inclined surface of the side surface of the wiring layer is smaller than an inclination angle of the second inclined surface of the side surface of the wiring layer in a state in which the first bending point is interposed between the inclination angles.

2. The magnetic element according to claim 1, wherein the wiring layer includes a first ferromagnetic layer, a magnetic recording layer, and a nonmagnetic underlayer in order from a position closest to the nonmagnetic layer.

3. The magnetic element according to claim 1, wherein the wiring layer includes a first ferromagnetic layer and a conductive layer in order from a position closest to the nonmagnetic layer.

4. The magnetic element according to claim 2, wherein the first bending point is located on a side surface of the first ferromagnetic layer.

5. The magnetic element according to claim 2, wherein the first bending point is located on a side surface of the magnetic recording layer.

6. The magnetic element according to claim 2, wherein the first bending point is located on a side surface of the underlayer.

7. The magnetic element according to claim 3, wherein the first bending point is located on a side surface of the conductive layer.

8. The magnetic element according to claim 2, wherein the first bending point is located at a boundary between the first ferromagnetic layer and the magnetic recording layer.

9. The magnetic element according to claim 2, wherein the first bending point is located at a boundary between the magnetic recording layer and the underlayer.

10. The magnetic element according to claim 3, wherein the first bending point is located at a boundary between the first ferromagnetic layer and the conductive layer.

11. The magnetic element according to claim 1, wherein a distance between an end portion of the nonmagnetic layer and the first bending point is longer than a distance between an end portion of the wiring layer and the first bending point in a third direction orthogonal to the first direction and the second direction in the cross section orthogonal to the first direction.

12. The magnetic element according to claim 1, wherein a distance between an end portion of the nonmagnetic layer and the first bending point in the second direction is longer than a distance between an end portion of the wiring layer and the first bending point in the second direction in the cross section orthogonal to the first direction.

13. The magnetic element according to claim 1, wherein the side surface has the two bending points, and the inclination angle of the second inclined surface located far from the nonmagnetic layer is larger than an inclination angle of the third inclined surface located near the nonmagnetic layer in a state in which the second bending point at a position that is second farthest from the nonmagnetic layer next to the first bending point among the bending points is interposed between the inclination angles.

14. The magnetic element according to claim 13, wherein a distance between the first bending point and the second bending point is longer than a distance between the end portion of the wiring layer and the first bending point in the third direction orthogonal to the first direction and the second direction in the cross section orthogonal to the first direction.

15. The magnetic element according to claim 13, wherein a distance between the first bending point and the second bending point in the second direction is longer than a distance between an end portion of the wiring layer and the first bending point in the second direction in the cross section orthogonal to the first direction.

16. The magnetic element according to claim 1, wherein the first bending point extends in the first direction.

17. The magnetic element according to claim 2, wherein a resistance-area product (RA) of the nonmagnetic layer is $1 \times 10^4$ $\Omega\mu m^2$ or more.

18. The magnetic element according to claim 2, wherein the nonmagnetic layer has a thickness of 2.0 nm or more.

19. The magnetic element according to claim 1, further comprising an insulating layer on a surface of the wiring layer opposite to the nonmagnetic layer.

20. A magnetic recording array having a plurality of the magnetic elements according to claim 1, further comprising a second ferromagnetic layer on the nonmagnetic layer opposite to the wiring layer.

* * * * *